United States Patent
Saunderson et al.

(10) Patent No.: US 7,660,323 B2
(45) Date of Patent: Feb. 9, 2010

(54) CASCADE CONTROL SYSTEM FOR NETWORK UNITS

(75) Inventors: Peter A Saunderson, Berkhamsted (GB); Michael D Hutchings, New Barnet (GB)

(73) Assignee: 3Com Corporation, Marlborough, MA (US)

( * ) Notice: Subject to any disclaimer, the term of this patent is extended or adjusted under 35 U.S.C. 154(b) by 507 days.

(21) Appl. No.: 10/876,654

(22) Filed: Jun. 28, 2004

(65) Prior Publication Data

US 2005/0198373 A1 Sep. 8, 2005

(51) Int. Cl.
*H04L 12/54* (2006.01)
*G06F 13/24* (2006.01)

(52) U.S. Cl. ........................ 370/428; 710/260
(58) Field of Classification Search ................ 370/392, 370/428; 710/260
See application file for complete search history.

(56) References Cited

U.S. PATENT DOCUMENTS

2003/0118021 A1* 6/2003 Donoghue et al. .......... 370/392

FOREIGN PATENT DOCUMENTS

GB    2368748 A    5/2002
GB    2383508 A    6/2003

* cited by examiner

*Primary Examiner*—Seema S Rao
*Assistant Examiner*—Wanda Z Russell

(57) ABSTRACT

A network unit for the reception and forwarding of data packets and for use in a stack of similar units includes a data processor and cascade control logic for the exchange of control frames with others of said units in the stack. The cascade control logic is operative to cooperate by means of the control frames in an automatic process for incrementally applying stack numbers to the units in the stack. The cascade control logic can retain a stack number in storage and the data processor is operative to execute a program to apply to the network unit and the other units progressive stack numbers which accommodate previously applied and retained stack numbers. The network unit can act as a master applying the program to the other units and as a slave whereupon it receives a stack number determined by another unit in the stack. The program may determine the validity of a set of numbers applied to units in the stack by computing the aggregate of numbering gaps between numbered units and comparing the aggregate with a predetermined maximum. The program distinguishes between units which are in an automatic numbering mode and a non-automatic numbering mode and disregards units in the non-automatic numbering mode in the application of progressive stack numbers.

9 Claims, 27 Drawing Sheets

| | Bit 7 | Bit 6 | Bit 5 | Bit 4 | Bit 3 | Bit 2 | Bit 1 | Bit 0 |
|---|---|---|---|---|---|---|---|---|
| Byte 4 | Additional_Data[15:8] | | | | | | | |
| Byte 3 | Additional_Data[7:0] | | | | | | | |
| Byte 2 | POWER[7:0] | | | | | | | |
| Byte 1 | MAX_NO[3:0] | | | | MISCONFIG | MISCONFIG_REQ | HEAL | HEAL_REQ |
| Byte 0 | UNIT_NO[3:0] | | | | CHOSEN | UP | AD_CHNG | IDLE |

```
always @(posedge T_clk or negedge reset)
begin
  if (reset)
    PRIMARY = FALSE;
  end
  else begin
    if (smiRegWr)
      PRIMARY = OWN_PRIMARY;
    else if (!CTRL_OK_DOWN | !CTRL_OK_UP)
      PRIMARY = TRUE;
    else if (!MY_POWER)
      PRIMARY = FALSE;
  end
end
```

FIG. 6

```
always @(posedge clk or negedge reset)
begin
  if (reset) begin
    my_up_regs_UNIT_NO = 0;
    my_down_regs_UNIT_NO = 0;
  end
  else begin
    if (PRIMARY) begin
      if (!CTRL_OK_DOWN) begin
        my_up_regs_UNIT_NO = 0;
        my_up_regs_UP = TRUE;
      end
      if (!CTRL_OK_UP) begin
        my_down_regs_UNIT_NO = 0;
        my_down_regs_UP = FALSE;
      end
      if (CTRL_OK_DOWN && CTRL_OK_UP) begin
        my_up_regs_UNIT_NO = 0;
        my_up_regs_UP = TRUE;
        my_down_regs_UNIT_NO = 0;
        my_down_regs_UP = FALSE;
      end
    end
    else begin
      if (CTRL_OK_DOWN && !down_regs_IDLE)
        my_up_regs_UNIT_NO = 1 + down_regs_UNIT_NO;
      if (CTRL_OK_UP && !up_regs_IDLE)
        my_down_regs_UNIT_NO = 1 + up_regs_UNIT_NO;
    end
  end
end
```

FIG. 7

```
always @(posedge enFrame or negedge reset)
begin
  if (reset) begin
    my_up_regs_IDLE = TRUE;
    my_down_regs_IDLE = TRUE;
    OLD_PRIMARY = FALSE;
    IDLE_COUNT = 0;
  end
  else begin
    if (PRIMARY) begin
      OLD_PRIMARY = TRUE;
      if (!CTRL_OK_DOWN)
        my_up_regs_IDLE = FALSE;
      if (!CTRL_OK_UP)
        my_down_regs_IDLE = FALSE;
      if (CTRL_OK_DOWN && CTRL_OK_UP) begin
        my_up_regs_IDLE = FALSE;
        my_down_regs_IDLE = FALSE;
      end
    end
    else begin
      if (OLD_PRIMARY && IDLE_COUNT<8) begin
        my_up_regs_IDLE = TRUE;
        my_down_regs_IDLE = TRUE;
        IDLE_COUNT = IDLE_COUNT +1;
      end
      else if (OLD_PRIMARY) begin
        OLD_PRIMARY = FALSE;
        IDLE_COUNT = 0;
      end
      else begin
        my_up_regs_IDLE = down_regs_IDLE;
        my_down_regs_IDLE = up_regs_IDLE;
      end
    end
  end
end
```

FIG. 8

```
always @(posedge clk or negedge reset)
begin
  if (reset) begin
    my_up_regs_UP = TRUE;
    my_down_regs_UP = FALSE;
  end
  else begin
    if (PRIMARY) begin
      if (!CTRL_OK_DOWN && CTRL_OK_UP) begin
        my_up_regs_UP = TRUE;
        my_down_regs_UP = up_regs_UP;
      end
      if (!CTRL_OK_UP && CTRL_OK_DOWN) begin
        my_down_regs_UP = FALSE;
        my_up_regs_UP = down_regs_UP;
      end
      if (CTRL_OK_DOWN & CTRL_OK_UP) begin
        my_up_regs_UP = TRUE;
        my_down_regs_UP = FALSE;
      end
    end
    else begin
      my_up_regs_UP = down_regs_UP;
      my_down_regs_UP = up_regs_UP;
    end
  end
end
```

FIG. 9

```
always @(posedge clk or negedge reset)
begin
  if (reset) begin
    my_up_regs_CHOSEN = TRUE;
    my_down_regs_CHOSEN = FALSE;
  end
  else begin
    if (!MY_POWER) begin
      OWN_UP_CHOSEN = FALSE;
      OWN_DOWN_CHOSEN = FALSE;
    end
    if (CTRL_OK_UP && !CTRL_OK_DOWN && !OWN_UP_CHOSEN &&
    !OWN_DOWN_CHOSEN) begin
      my_up_regs_CHOSEN = !up_regs_CHOSEN;
      my_down_regs_CHOSEN = up_regs_CHOSEN;
    end
    else if (CTRL_OK_DOWN && !CTRL_OK_UP && !OWN_UP_CHOSEN &&
    !OWN_DOWN_CHOSEN) begin
      my_up_regs_CHOSEN = down_regs_CHOSEN;
      my_down_regs_CHOSEN = !down_regs_CHOSEN;
    end
    else if (OWN_UP_CHOSEN && !OWN_DOWN_CHOSEN) begin
      my_up_regs_CHOSEN = OWN_UP_CHOSEN;
      my_down_regs_CHOSEN = !OWN_UP_CHOSEN;
    end
    else if (OWN_DOWN_CHOSEN && !OWN_UP_CHOSEN) begin
      my_down_regs_CHOSEN = OWN_DOWN_CHOSEN;
      my_up_regs_CHOSEN = !OWN_DOWN_CHOSEN;
    end
    else begin
      my_up_regs_CHOSEN = down_regs_CHOSEN;
      my_down_regs_CHOSEN = up_regs_CHOSEN;
    end
  end
end
```

FIG. 10

```
always @(posedge clk or negedge reset)
begin
  if (reset) begin
    my_up_regs_MAX_NO = 0;
    my_down_regs_MAX_NO = 0;
  end
  else begin
    if (CTRL_OK_UP && !CTRL_OK_DOWN && !up_regs_IDLE) begin
      my_up_regs_MAX_NO = up_regs_MAX_NO;
      my_down_regs_MAX_NO = up_regs_MAX_NO;
    end
    else if (CTRL_OK_DOWN && !CTRL_OK_UP && !down_regs_IDLE) begin
      my_up_regs_MAX_NO = down_regs_MAX_NO;
      my_down_regs_MAX_NO = down_regs_MAX_NO;
    end
    else if (PRIMARY && CTRL_OK_UP && CTRL_OK_DOWN && !up_regs_IDLE
    && !down_regs_IDLE) begin
      my_up_regs_MAX_NO = up_regs_MAX_NO;
      my_down_regs_MAX_NO = down_regs_MAX_NO;
    end
    else if (!PRIMARY) begin
      if (!down_regs_IDLE)
        my_up_regs_MAX_NO = down_regs_MAX_NO;
      if (!up_regs_IDLE)
        my_down_regs_MAX_NO = up_regs_MAX_NO;
    end
  end
end
```

FIG. 11

```
always @(posedge clk or negedge reset)
begin
   if (reset) begin
      my_up_regs_POWER = 8'h00;
      my_down_regs_POWER = 8'h00;
   end
   else begin
      if (PRIMARY && !CTRL_OK_DOWN && CTRL_OK_UP && my_up_regs_CHOSEN) begin
         my_up_regs_POWER = MY_POWER << my_up_regs_UNIT_NO;
         if (!up_regs_IDLE)
            my_down_regs_POWER = up_regs_POWER;
      end
      else if (PRIMARY && !CTRL_OK_UP && CTRL_OK_DOWN && my_down_regs_CHOSEN)
      begin
         if (!down_regs_IDLE)
            my_up_regs_POWER = down_regs_POWER;
         my_down_regs_POWER = MY_POWER << my_down_regs_UNIT_NO;
      end
      else if (PRIMARY && CTRL_OK_DOWN && CTRL_OK_UP) begin
         if (my_up_regs_CHOSEN) begin
            my_up_regs_POWER = MY_POWER << my_up_regs_UNIT_NO;
            if (!down_regs_IDLE)
               my_down_regs_POWER = down_regs_POWER;
         end
         else if (my_down_regs_CHOSEN) begin
            my_down_regs_POWER = MY_POWER << my_down_regs_UNIT_NO;
            if (!up_regs_IDLE)
               my_up_regs_POWER = up_regs_POWER;
         end
      end
      else begin
         if (!up_regs_IDLE) begin
            if (my_up_regs_CHOSEN) begin
               my_down_regs_POWER = up_regs_POWER;
            end
            else if (my_down_regs_CHOSEN && !my_down_regs_IDLE) begin
               my_down_regs_POWER = up_regs_POWER | (MY_POWER <<
                  my_down_regs_UNIT_NO);
            end
         end
         if (!down_regs_IDLE) begin
            if (my_up_regs_CHOSEN && !my_up_regs_IDLE) begin
               my_up_regs_POWER = down_regs_POWER | (MY_POWER <<
                  my_up_regs_UNIT_NO);
            end
            else if (my_down_regs_CHOSEN) begin
               my_up_regs_POWER = down_regs_POWER;
            end
         end
      end
   end
   if (my_down_regs_CHOSEN && !my_up_regs_IDLE && !my_down_regs_IDLE) begin
      CURRENT_POWER = my_up_regs_POWER;
   end
   else if (my_up_regs_CHOSEN && !my_up_regs_IDLE && !my_down_regs_IDLE)
   begin
      CURRENT_POWER = my_down_regs_POWER;
   end
   else
      CURRENT_POWER = 0;
   end
end
```

FIG. 12

```
always @(posedge clk or negedge reset)
begin
  if (reset)
    OWN_UP_Additional_Data = 0;
    OWN_DOWN_Additional_Data = 0;
  end
  else
  begin
      if (My_POWER) begin
        my_up_regs_Additional_Data = OWN_UP_Additional_Data;
        my_down_regs_Additional_Data = OWN_DOWN_Additional_Data;
      end
      else begin
        my_up_regs_Additional_Data = down_regs_Additional_Data;
        my_down_regs_Additional_Data = up_regs_Additional_Data;
      end
  end
end
```

FIG. 13

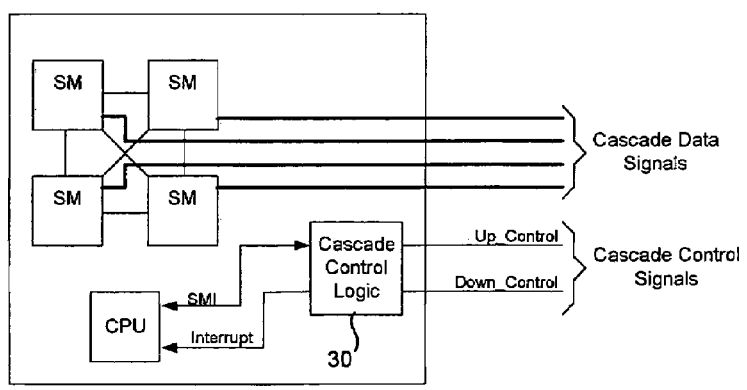

FIG. 14

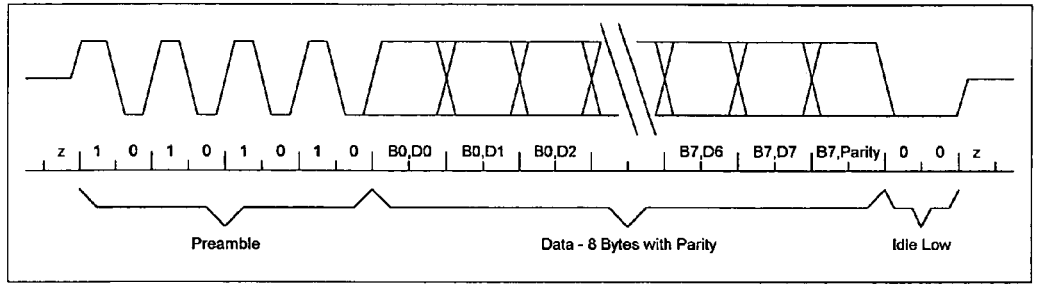

FIG. 18

|  | Byte 7 | Byte 6 | Byte 5 | Byte 4 | Byte 3 | Byte 2 | Byte 1 | Byte 0 |
|---|---|---|---|---|---|---|---|---|
| Bytes 16-19 | additional | additional | additional | additional | UP_MAC5 | UP_MAC4 | UP_MAC3 | UP_MAC2 |
| Bytes 8-15 | UP_MAC1 | UP_MAC0 | DWN_MAC5 | DWN_MAC4 | DWN_MAC3 | DWN_MAC2 | DWN_MAC1 | DWN_MAC0 |
| Bytes 0-7 | OWN_MAC5 | OWN_MAC4 | OWN_MAC3 | OWN_MAC2 | OWN_MAC1 | OWN_MAC0 | FLAGS | UNIT_NO_DATA |

FIG. 19

|  | Bit 7 | Bit 6 | Bit 5 | Bit 4 | Bit 3 | Bit 2 | Bit 1 | Bit 0 |
|---|---|---|---|---|---|---|---|---|
| FLAGS | COMMAND | OWN_ISOLATE | OWN_HARD | OWN_CONFIG | PRIMARY | CTRL_OK_DOWN | CTRL_OK_UP | CHOSEN |
| UNIT_NO_DATA | | | Switch_Number | | | | OWN_UNIT_NO | |

FIG. 20

|  | Bit 7 | Bit 6 | Bit 5 | Bit 4 | Bit 3 | Bit 2 | Bit 1 | Bit 0 |
|---|---|---|---|---|---|---|---|---|
| Byte 4 | Additional_Data[15:8] | | | | | | | |
| Byte 3 | Additional_Data[7:0] | | | | | | | |
| Byte 2 | POWER[7:0] | | | | | | | |
| Byte 1 | MAX_NO[3:0] | | | | MISCONFIG | MISCONFIG_REQ | HEAL | HEAL_REQ |
| Byte 0 | UNIT_NO[3:0] | | | | CHOSEN | UP | AD_CHNG | IDLE |

FIG. 22

|  | Bit 7 | Bit 6 | Bit 5 | Bit 4 | Bit 3 | Bit 2 | Bit 1 | Bit 0 |
|---|---|---|---|---|---|---|---|---|
| Byte 6 | HEAL_UP | UP_CHOSEN | DOWN_CHOSEN | OWN_PRIMARY | Reserved | Reserved | Reserved | Reserved |
| Byte 5 | OWN_UP_Addtional_Data | | | | | | | |
| Byte 4 | Additional_Data[15:8] | | | | | | | |
| Byte 3 | Additional_Data[7:0] | | | | | | | |
| Byte 2 | POWER[7:0] | | | | | | | |
| Byte 1 | MAX_NO[3:0] | | | | MISCONFIG | MISCONFIG_REQ | HEAL | HEAL_REQ |
| Byte 0 | UNIT_NO[3:0] | | | | CHOSEN | UP | AD_CHNG | IDLE |

FIG. 23

|  | Bit 7 | Bit 6 | Bit 5 | Bit 4 | Bit 3 | Bit 2 | Bit 1 | Bit 0 |
|---|---|---|---|---|---|---|---|---|
| Byte 6 | HEAL_DOWN | Reserved | Reserved | Reserved | PRIMARY | CTRL_UP_OK | CTRL_DOWN_OK | MY_POWER |
| Byte 5 | OWN_DOWN_Additional_Data | | | | | | | |
| Byte 4 | Additional_Data[15:8] | | | | | | | |
| Byte 3 | Additional_Data[7:0] | | | | | | | |
| Byte 2 | POWER[7:0] | | | | | | | |
| Byte 1 | MAX_NO[3:0] | | | | MISCONFIG | MISCONFIG_REQ | HEAL | HEAL_REQ |
| Byte 0 | UNIT_NO[3:0] | | | | CHOSEN | UP | AD_CHNG | IDLE |

FIG. 24

|  | Bit 7 | Bit 6 | Bit 5 | Bit 4 | Bit 3 | Bit 2 | Bit 1 | Bit 0 |
|---|---|---|---|---|---|---|---|---|
| Byte 27 | down_regs_Additional_Data[15:8] ||||||||
| Byte 26 | down_regs_Additional_Data[7:0] ||||||||
| Byte 25 | down_regs_POWER[7:0] ||||||||
| Byte 24 | down_regs_MAX_NO[3:0] |||| down_regs_MISCONFIG | down_regs_MISCONFIG_REQ | down_regs_HEAL | down_regs_HEAL_REQ |
| Byte 23 | down_regs_UNIT_NO[3:0] |||| down_regs_CHOSEN | down_regs_UP | down_regs_AD_CHNG | down_regs_IDLE |
| Byte 22 | up_regs_Additional_Data[15:8] ||||||||
| Byte 21 | up_regs_Additional_Data[7:0] ||||||||
| Byte 20 | up_regs_POWER[7:0] ||||||||
| Byte 1F | up_regs_MAX_NO[3:0] |||| up_regs_MISCONFIG | up_regs_MISCONFIG_REQ | up_regs_HEAL | up_regs_HEAL_REQ |
| Byte 1E | up_regs_UNIT_NO[3:0] |||| up_regs_CHOSEN | up_regs_UP | up_regs_AD_CHNG | up_regs_IDLE |
| Byte 1D | HEAL_DOWN | Reserved | Reserved | Reserved | PRIMARY | CTRL_UP_OK | CTRL_DOWN_OK | MY_POWER |
| Byte 1C | OWN_DOWN_Additional_Data ||||||||
| Byte 1B | my_down_regs_Additional_Data[15:8] ||||||||
| Byte 1A | my_down_regs_Additional_Data[7:0] ||||||||
| Byte 19 | my_down_regs_POWER[7:0] ||||||||
| Byte 18 | my_down_regs_MAX_NO[3:0] |||| my_down_regs_MISCONFIG | my_down_regs_MISCONFIG_REQ | my_down_regs_HEAL | my_down_regs_HEAL_REQ |
| Byte 17 | my_down_regs_UNIT_NO[3:0] |||| my_down_regs_CHOSEN | my_down_regs_UP | my_down_regs_AD_CHNG | my_down_regs_IDLE |
| Byte 16 | HEAL_UP | UP_CHOSEN | DOWN_CHOSEN | OWN_PRIMARY | Reserved | Reserved | Reserved | Reserved |
| Byte 15 | OWN_UP_Addtional_Data ||||||||
| Byte 14 | my_up_regs_Additional_Data[15:8] ||||||||
| Byte 13 | my_up_regs_Additional_Data[7:0] ||||||||
| Byte 12 | my_up_regs_POWER[7:0] ||||||||
| Byte 11 | my_up_regs_MAX_NO[3:0] |||| my_up_regs_MISCONFIG | my_up_regs_MISCONFIG_REQ | my_up_regs_HEAL | my_up_regs_HEAL_REQ |
| Byte 10 | my_up_regs_UNIT_NO[3:0] |||| my_up_regs_CHOSEN | my_up_regs_UP | my_up_AD_CHNG | my_up_IDLE |

FIG. 25

| AD | AD | AD | AD | AD | AD | AD | AD |

FIG. 29A

| A1 | A2 | A3 | A4 | A5 | A6 | A7 | A8 |

FIG. 29B

| 0 | 0 | 0 | 0 | 0 | 0 | 0 | 0 |
|---|---|---|---|---|---|---|---|
| A1 | A2 | A3 | A4 | A5 | A6 | A7 | A8 |

FIG. 29C

CASCADE CONTROL SYSTEM FOR NETWORK UNITS

FIELD OF THE INVENTION

This invention relates to communication networks. The invention specifically concerns the control of network units such as switches connected or for use in a 'cascade' or 'stack'.

BACKGROUND TO THE INVENTION

The physical elements in a packet-based data communication system commonly include multi-port units such as switches and routers. Such units are commonly and conveniently manufactured with a fixed plurality of ports by means of which the units can be connected by way of appropriate transmission links (such as cables or optical fibres) to other units or user terminals. In order to provide greater versatility in constructing networks while minimising the number of different sizes of units that need to be deployed it is known to render the units 'stackable' by which is meant that a multiplicity of them can be interconnected to form effectively a single controllable entity. It is customary to make such units physically stackable in a column although this physical aspect of the term is not essential either to the meaning of 'stackable' or to the present invention.

In order to provide intercommunication between the units, so that for example packets received at any of the ordinary ports (commonly termed 'front panel' ports) can be forwarded from a port or ports on another unit or units, depending on the addressing of the packets and the nature of them, it is customary to connect stacked units together by means of a cascade, which is the term used for the communication links and associated control functions by means of which packets are transmitted between the units in the stack.

The design and organisation of a cascade are attended by some considerable complexity.

Although very simple cascades can be constituted by means of ordinary communication links between ports on a stack of similar or compatible devices, a variety of operational desiderata or network constraints require a cascade connection to be rather more sophisticated and produce greater difficulties in design. For example, if a high performance cascade connection is to be maintained while providing fair access to the cascade connection for all the units in the stack, it is a practical desirability for the conveyance of certain control or status information to the all the units of the stack so that, for example, an arbitration protocol may be observed. Such an arbitration protocol usually requires such data as the number of units in the stack and preferably also some identification number for each of those units. Furthermore, it is a desirable feature of a cascaded stack that notwithstanding the powering-down or failure of one of the units in the stack, it can continue to operate in respect of the remaining units in the stack. A similar desirable feature is the accommodation of 'hot' insertion or swapping of units in the stack.

To some extent information in respect of the stack may be accommodated within packets which are forwarded onto the cascade. Examples are disclosed in prior applications for O'Keeffe et al, Ser. No. 09/562,131 filed 1 May 2000 and O'Keeffe et al, Ser. No. 09/668,339 filed 25 Sep. 2000, both commonly assigned herewith. These examples allow for the incorporation within a packet header of fields that identify which of the units have ports that are members of a trunked connection to the stack. However, the inclusion of control or status data relating to the units within packet headers is generally inconvenient if at all feasible.

Donoghue et al Ser. No. 10/677,738 filed 8 Feb. 2002 and commonly assigned herewith discloses the provision in each unit of stack cascade control logic which communicates control and status data to other units of the stack by means of control frames exchanged over point-to-point half-duplex control links between a unit and each of the next preceding and next succeeding units in a cascaded stack. The cascade control logic in each unit is organised so that in one ('up') direction it is a master and in the other ('down') direction it is a slave in respect of the control path. Status information represented by the control frames can be used to control a packet-switching engine to provide self-healing of a data path in the cascade.

Although the automatic numbering process is useful in the initial formation of a stack, the renumbering of units when a stack is reformed or augmented is not necessarily desirable. Other disadvantages of the earlier system include the provision of cascade connections as both a 'down' link and an 'up' link, and a need to employ a special cable for a 'resilient' connection, i.e. from the 'top' to the 'bottom' of the stack.

SUMMARY OF THE INVENTION

A main object of the invention is to provide an improved and versatile cascade control.

In one practical embodiment of the invention, a network unit for the reception and forwarding of data packets, and for use in a stack of similar units, includes a data processor and cascade control logic for the exchange of control frames with others of said units in the stack. The cascade control logic is operative to cooperate by means of said control frames in an automatic process for incrementally applying stack numbers to the units in the stack. Furthermore, the cascade control logic can retain a stack number in storage and the data processor is operative to execute a program to apply to the network unit and other units progressive stack numbers which accommodate previously applied and retained stack numbers.

Preferably the network unit can act as a master applying said program to said other units and as a slave whereupon it receives a stack number determined by another unit in the stack.

The aforesaid program may determine the validity of a set of numbers applied to units in the stack by computing the aggregate of numbering gaps between numbered units and comparing the aggregate with a predetermined maximum.

Preferably the program distinguishes between units which are in an automatic numbering mode and a non-automatic numbering mode and disregards units in the non-automatic numbering mode in the application of progressive stack numbers.

A further aspect of the invention concerns cascade logic which controls the transmission of the aforementioned control frames and is symmetrical relative to the 'up' and 'down' directions. A preferred embodiment of a cascade control logic for transmitting and receiving control frames of status and control data for a cascaded stack of network units comprises a first link layer for transmitting control frames and receiving control frames at a first port; a second link layer for receiving and transmitting control frames at a second port, each link layer providing a respective enabling signal in the presence of valid control frames received at a respective one of the first and second ports; a first register for storing data from control frames received at said first port; a second register for storing data derived from data stored in said first register; a third register for storing data from control frames received at said second port; a fourth register for storing data derived from data stored in said third register; and a transport layer which: (a) couples data received at said first port to said first register in the presence of the respective enabling signal for the first port and couples data stored in said fourth register to said first register in the absence of the respective enabling signal for the first port; and (b) couples data received at said second port to said third register in the presence of the respective enabling signal for the second port and couples data stored in said second register to said third register in the absence of the respective enabling signal for the second port.

The cascade control logic is preferably coupled to means for processing data stored in the first and third registers to provide data for the second and fourth registers.

The cascade control logic is preferably programmed to participate in an automatic numbering sequence, said control frames including fields that indicate numbers in said sequence and also indications of the status of units in the cascade; the cascade control logic is preferably coupled to a processor which allows user-modification of said automatic numbering.

Various other aspects of the invention concern the provision to units in the stack of specific information (such as a system ID, a database of units, a list of powered units, stack state changes and shortest path information), the determination of a 'master unit' for the stack and generally to employ software to avoid at least some of the limitations of the hardware necessitated by previous practice.

Further features of the invention will become apparent from a consideration of a specific example which will be described with reference to the accompanying drawings.

BRIEF DESCRIPTION OF THE DRAWINGS

FIG. 6 illustrates a numbering algorithm for use by the cascade control logic.

FIG. 7 illustrates an algorithm for the determination of primary' status

FIG. 8 illustrates an algorithm for the generation of IDLE frames

FIG. 9 illustrates an algorithm for the setting of an UP indicator.

FIG. 10 illustrates an algorithm for the setting of a CHOSEN indicator.

FIG. 11 illustrates an algorithm for the computation of a maximum number of units.

FIG. 12 illustrates an algorithm for the computation of an indication of which units in the stack are powered.

FIG. 13 illustrates an algorithm for the handling of addition data in control frames.

FIG. 14 illustrates the disposition of cascade control logic within a network unit.

FIG. 18 illustrates the content of control frames.

FIG. 19 illustrates the content of cascade control software packets

FIG. 20 shows certain bit fields for the packets illustrated in FIG. 19.

FIG. 22 illustrates the register format for two registers in the cascade logic shown in FIG. 3.

FIG. 23 illustrates the register format for another register in the cascade logic shown in FIG. 3.

FIG. 24 illustrates the register format for another register in the cascade logic shown in FIG. 3.

FIG. 25 illustrates the register format for a further register to which a data processor has recourse.

FIGS. 29A to 29C illustrate another numbering scenario.

DETAILED DESCRIPTION OF A SPECIFIC EMBODIMENT

There follows a detailed description of a specific example, which is adapted for use in the bi-directional cascade described in Donoghue et al, supra, but which has a more general utility.

Figure 1A:
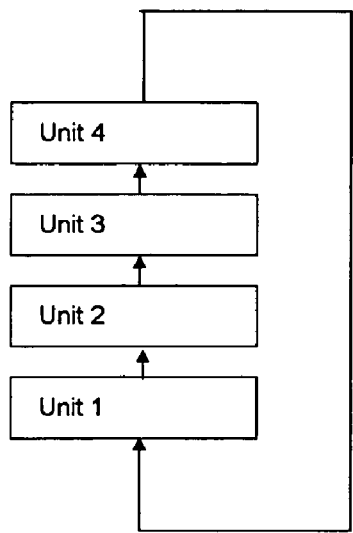
FIGS. 1A and 1B illustrate topologically different dispositions of a stack.
Figure 1B:
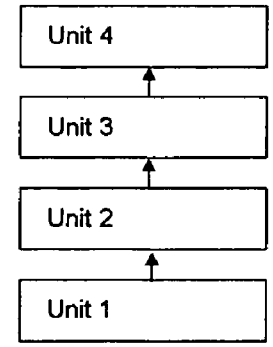

FIGS. 1A and 1B illustrate two ways of connecting a stack of network units such as switches. FIG. 1A illustrates a 'resilient' connection, in which all the units 1 to 4 are connected to two other units. FIG. 1B illustrates a 'non-resilient' connection, in which one of the units has a silent 'down' link and the other has a 'silent' up link. In the Figures, each of the units may be a multiple-port switch as described in Donoghue et al incorporated herein by reference.

Cascade Architecture

Although the particular cascade architecture is not a limitation on the present invention, one architecture will be described by way of example.

Figure 2A:
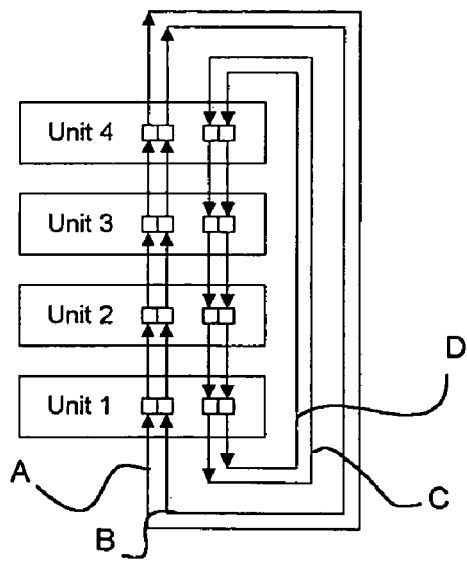
FIGS. 2A and 2B illustrate different modes of operation of a bidirectional resilient trunk ring cascade.
Figure 2B:
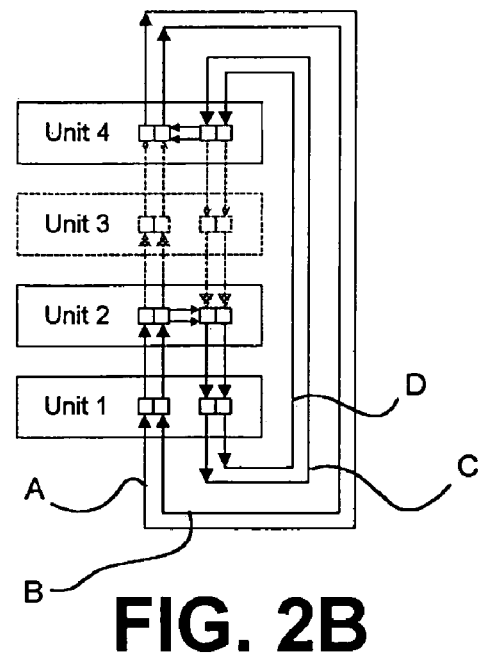

FIGS. 2A and 2B illustrate one form of bi-directional cascade which comprises a single trunk made up of four 2.5 Gbps rings. Within a unit, two of the four links transmit data to units "above" them in the stack, while the other two transmit data to units "below" them. The links between the units are point-to-point connections that each constitutes an individual MAC domain. The links may be standard Ethernet with some additional signalling for cascade functions. All traffic goes into and out of the switching engine of each unit.

The physical design of the connection may be such that there is no pin out difference between an up link and a down link. The cable provides the cross over function for the cascade data path to ensure that the transmit and receive paths are correctly configured. This allows for the up link and the down link to be swapped if the user connects together two up or down links.

The bi-directional daisy-chain of links forms a complete circle. In normal operation this creates two virtual rings: one providing clockwise progression of data packets, the other an anti-clockwise progression. In addition to the data path, there is also a corresponding control path by which the units exchange control frames. The existence of a broken cable or the powering down or removal of a unit may be detected by the absence of control frames. Control signals to the units govern the switching engines to redirect data frames to avoid the 'failed' connection or unit. One example is shown in FIG. 2B wherein unit 3 has powered down. The units 2 and 4 provide loop-back of data frames to continue the operation of the stack with units 1, 2 and 4. In the healed configuration shown in FIG. 2B, the data frames which are diverted from an inoperative link or unit are controlled by the switching engines of the adjacent units to exit a given unit in the opposite direction of travel around the cascade. Thus, with the rings denoted A, B, C and D, wherein rings A and B denote progression in the clockwise direction and rings C and D denote progression in the anti-clockwise direction, the following occurs. Normally, a packet entering a unit on ring A will leave the unit on the same ring to go to the next unit, and the same applies to all the rings. Although it is not directly relevant to the present invention, the units would have a load balancing arrangement so that the cascade traffic is, so far as feasible, evenly distributed among the four rings of the cascade. If however, as shown in FIG. 2B, unit 3 is inoperative, packets entering unit 2 by ring A will leave unit 2 by either ring C or ring D.

Unit 2 heals the ring by forwarding on-going packets from ports A and B to ports C and D.

Unit 4 heals the ring by forwarding on-going packets from ports C and D to ports A and B.

Unit 1 must also take action because normal packet lookup and forwarding must only be performed on ports A and B. Ports C and D must be configured in a pass-through mode that does not engage the lookup-engine. This avoids the condition where packets received on ports C and D are hashed for transmission on ports A and B. Such packets could circulate indefinitely.

Moreover, the cascade control logic provides loop-back of control frames to allow the cascade control path to "heal" in the same manner as the cascade data signals can be healed. The healing mechanism reduces the cascade to a unidirectional trunk ring with half the bandwidth.

The cascade may be source-routed, so when a unit receives a packet, on a front (external) port, it will perform a full lookup for the destination unit and port within the cascade system, even if the packet is destined for another unit. The advantage of this technique is that no lookup bandwidth is required for cascade port ingress. The switch control software will need to learn the packet source's address (SA) against the ingress port and unit. If lookup tables are to remain current then units will have to update their lookup tables whenever a unit is removed from or added to the stack.

In addition to the cascade data path control frames constituted by a low bit rate control signal are used as indicated above in any out of band communication channel.

This bi-directional is called the cascade control path. In a 'resilient' system such as shown in FIG. 1A or FIG. 2A, the cascade control path creates two virtual rings, one preceding clockwise, the other anti-clockwise. If there is a break in the cascade wiring, due to a broken cable or removed unit, the cascade control logic can "loop-back" control frames. This allows the cascade control path to "heal".

The cascade control path is preferably a simple primary/secondary arrangement where one unit in the stack for each of the 'up' and 'down' paths is elected as the primary switch and will send active frames that the other units will receive, add information to and pass on till another primary switch receives the updated frame. If a powered down unit in the stack loses its cascade data path, it will not necessarily lose the cascade control path if (as is preferred) the cascade control logic is powered from a shared supply.

Cascade Control Logic

The cascade control logic is the hardware part of the cascade control design. The organisation of the software and its interaction with the cascade control logic will be described later.

Cascade Control Logic Architecture

The cascade control logic architecture can be regarded as consisting of three distinct layers. These are a link layer, a transport layer and a frame update layer.

Figure 3:
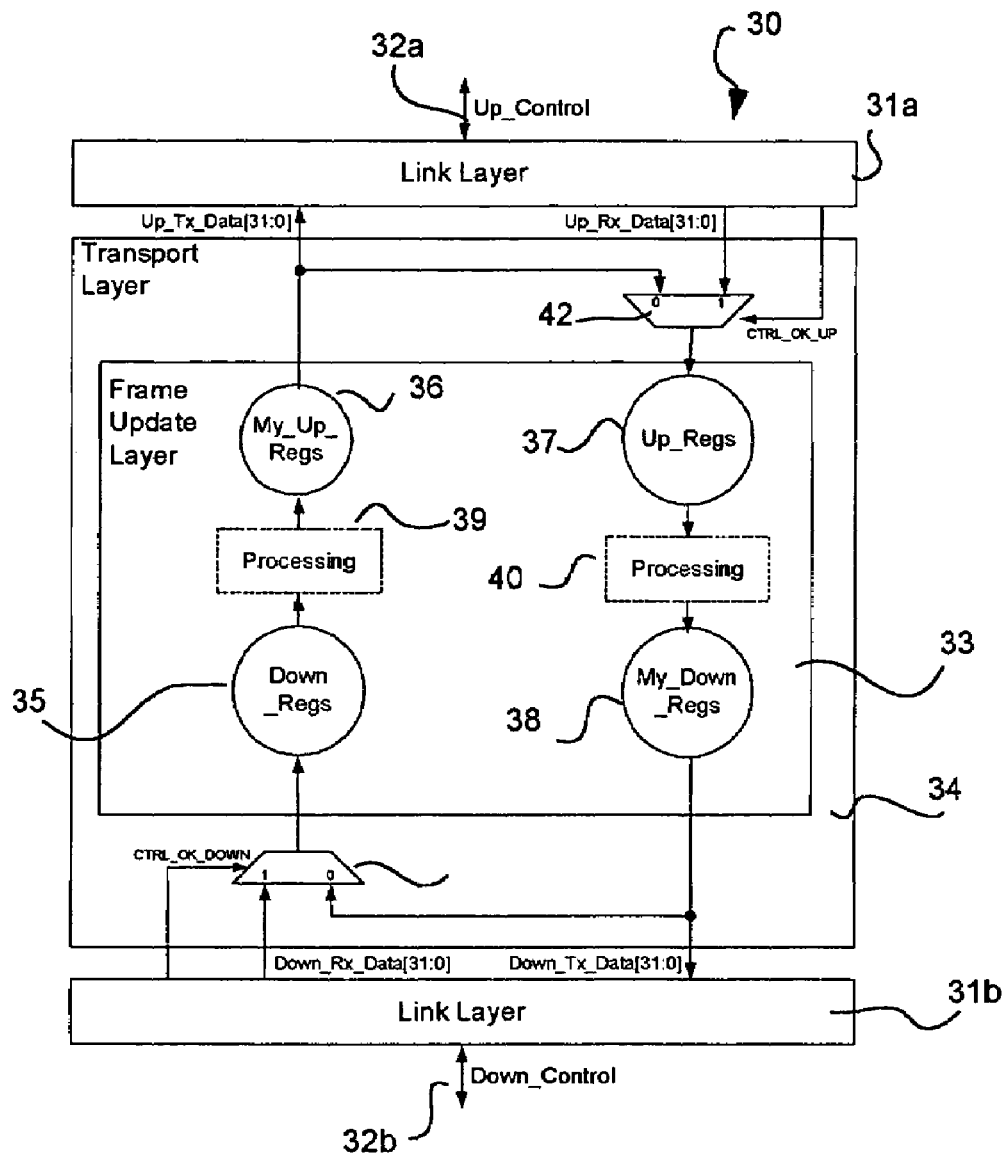
FIG. 3 illustrates an embodiment of cascade control logic.

FIG. 3 illustrates schematically a preferred embodiment of the cascade control logic 30. Two similar link layers 31a and 31b are respectively connected to control links 32a and 32b, denoted Up_Control and Down_Control respectively, which both receive control data from and supply control data to the frame update layer 33 by way of the transport layer 34.

The frame update layer includes four sets of registers 35 to 38, denoted respectively Down_Regs (registers 35), My_Up_Regs (registers 36), Up_Regs (registers 37) and My_Down_Regs (registers 38), a processing block 39 between registers 35 and 36 and a processing block 40 between registers 37 and 38.

The transport layer comprises multiplexers 41 and 42 operable as will be described.

The Down_Regs 35 may receive, depending on the state of a CTRL_OK_DOWN signal which controls multiplexer 41, either control data, i.e. DOWN_Rx_Data, received from link 32b or data looped back from My_Down_Regs (registers 38). Up_Regs 37 may receive, depending on the state of a CTRL_OK_UP signal which controls multiplexer 42, either Up_Rx_Data from Up_Control link 32a or data looped back from My_Up_Regs 36.

Figure 21:
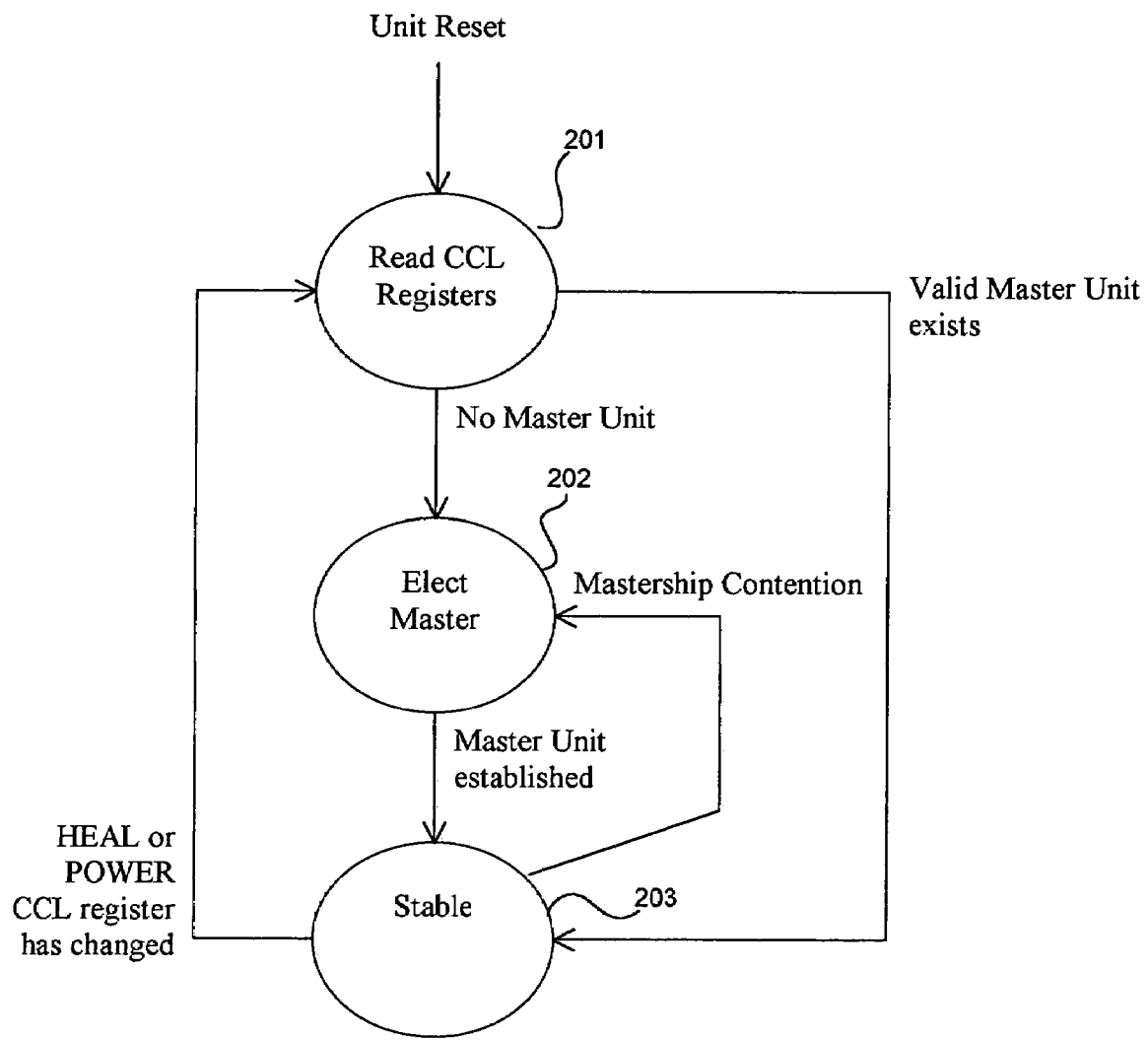
FIG. 21 is a state diagram for a network unit.

A data format for each of the Up_Regs registers 37 and the Down_Regs registers 35 is as shown in FIG. 20. A data format for the My_Up_Regs registers 36 is shown in FIG. 21. A data format for the My_Down_Regs 38 is shown in FIG. 22. A data format for a SMI memory map to which a CPU (to be described) may have recourse is shown in FIG. 23.

Cascade Control Link Layer

Two purposes of the link layer are to establish a control connection between two units and to assign master/slave roles to each end of the cascade control connections. These two are described below.

Two other purposes are to control the transmission of control frames between adjacent units and to indicate the status of the Up_Control and Down_Control links by means of the signals CTRL_OK_UP and CTRL_OK_DOWN (FIG. 3).

The control of the transmission of the control frames on a control link between adjacent units is achieved once the master/slave roles have been determined. Thereafter control frames pass back and forth across a half-duplex connection between the units at pre-determined times under the control of the master for the link.

Figures 4, 5:
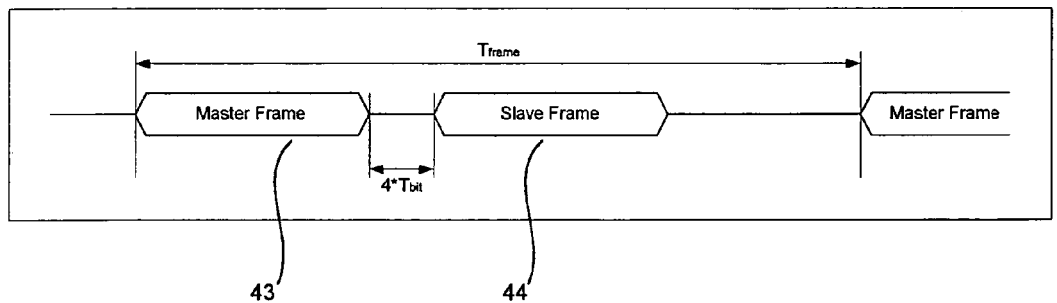
FIG. 4 illustrates the physical dimensions of a control frame.
FIG. 5 illustrates control frame data.

FIG. 4 illustrates the envelopes and relative timing of the control frames. The master transmits a 'master' control frame 43 every $T_{frame}$. The slave transmits a 'slave' control frame 44 four bit periods after receiving the master's control frame. The end of the frame is defined as being the end of an 'idle low' period, that follows the slave frame.

Each link layer provides to the transport layer and thence to the frame update layer the data content of received control frames. The link layer will discard received control frames that contain parity errors.

When the Up_Control link layer 31a fails to receive a slave frame then it will signal this failure condition by setting the CTRL_OK_UP signal to 0 (FALSE). Otherwise the Up_Control link is assumed to be valid and subsisting, the signal CTRL_OK_UP being 1 (TRUE). The Down_Control link layer 31b signals the state of the respective control link 32b by means of signal CTRL_OK_DOWN in a similar fashion. If there is no master frame then the link layer will revert to master operation so the failure of the link in this example is always detected by the lack of a slave frame.

The choice of a symmetrical link layer allows the use of one type of connector for all cables.

Cascade Control Transport Layer

The purposes of the transport layer 34 are to circulate a control frame, created and maintained by the cascade control frame layer through all units in the stack, and to ensure that the control frames presented for the processing by frame update layer 33 are not corrupted.

There is not necessarily a one-to-one relationship between frames received on the Down_Control link 31b and those transmitted on the Up_Control link 31a (and vice-versa), because each port may have respective master clocks which may differ slightly in frequency. There may be parity errors in the link layer. The transport layer ensures that either a new frame or the old frame is presented to the frame update layer 33. This means that the Up_Regs 37 and Down_Regs 35 must be presented only with valid frames (either IDLE or ACTIVE). A failure to conform to this rule may result in unnecessary interruption of the CPU (see FIG. 14).

In a non-resilient/healed stack, if either CTRL_OK_UP or CTRL_OK_DOWN is FALSE the signal indicates that the stack currently has a non-resilient wired configuration so the control data paths need to be looped-back within the transport layer. This effectively heals the control frame data path.

Frame Update Layer

The frame update layer 33 determines whether the unit acquires or relinquishes the primary unit status on either the UP or the DOWN path. If the unit has 'primary' status it initiates active frames on the appropriate path (UP or DOWN).

If the unit has 'secondary' (i.e. non-primary) status it will update each control frame passed to it from the link layer with its own local data. The frame update layer also alerts the cascade control software of stack state changes and error conditions The frame data is first generated by the frame update layer of a primary unit and is passed through the frame update layer of each stack unit. The frame update layer has two identical sides: The UP part (registers 35 and 36 and processing block 39) passes frames from the bottom of the stack to the top of the stack; the DOWN part (registers 37 and 38 and processing block 40) passes different frames from the top of the stack to the bottom.

In a simple (non-resilient) stack such as shown in FIG. 1B there are two ends and each end acts as a primary unit for one of the paths to generate control frames. The frames that reach the top of the stack allow the top unit to learn the total number of units in a stack and other state information. The control frames that reach the bottom of the stack allow all the units to learn the total number of units in the stack and other state information.

In a resilient stack such as shown in FIG. 1A there is a single primary unit that will pass control frames in both directions round the resilient stack connections. In a resilient stack the control frames on reception back at the primary unit will provide information about the number of units and other state information about the stack. This can then be passed on round the resilient loop to all the units.

Control Frame Data

The control frame data transmitted and received by the frame update layer has in this example the format shown in FIG. 5. In this example the control frame data comprises five bytes, denoted Byte0 to Byte4 and having significance as listed below.

Byte0 is set-up by each unit before the control frame is passed up to the next unit in the stack. It is made up of the following data fields:

UNIT_NO[3:0] is a four-bit field which indicates the current unit number of the unit that forwarded this frame.

CHOSEN is a single bit field. When CHOSEN is set, the field indicates which of the two frame paths is being used as the reference path by the cascade control software. It is set by the cascade control software and used by the frame update layer to identify the path that contains the NEXT_POWER calculation (see below).

The UP field is a single-bit field which when TRUE indicates that the packet originated from the UP side of the primary unit. When the UP bit is FALSE it indicates that the packet originated from the DOWN side of the primary unit. This bit is set by the frame update layer in a primary unit.

AD_CHNG is a one-bit field set hop by hop to indicate to the next unit that the cascade control software should be interrupted to read a new data value in an additional data field (Byte 7). This bit is set by the cascade control logic in the originating unit when the cascade control software writes to the Additional_Data[15:8] byte and results in an interrupt being generated in the next powered unit in the stack.

IDLE is a one-bit field which, when set, indicates that the current frame is an 'idle' frame. In an idle frame only the IDLE bit AD_CHNG and the Additional_Data data are valid. When the IDLE bit is cleared, the frame is an 'active' frame and all the frame data is valid. Only the frame update layer in a primary unit can set this bit.

Byte1 is made up of the following data fields:

HEAL_REQ is a one-bit field to which all units have write access. It indicates that a unit has identified that a connection has been lost and that the stack needs to heal. Note that HEAL_REQ is not looped back in a non-resilient stack.

HEAL is a one-bit field to which only the primary unit has write access. It indicates that the stack is currently healing. The bit is set in response to receiving a set HEAL_REQ bit.

MISCONFIG_REQ is a one-bit field to which all units have write access. When set it indicates that a unit has identified that there are too many units in the stack.

MISCONFIG is a one-bit field to which only the primary unit has write access. When set it indicates that the stack has too many units. This bit is set in response to receiving a set MISCONFIG_REQ bit.

MAX_NO[3:0] is a four-bit field which indicates the largest UNIT_NO in the stack.

Byte2 is an eight-bit bitmap termed POWER[7:0]: On the frame path with the CHOSEN bit set this bitmap lists the units in the stack with power. If a respective bit is set the unit exists and has power. These bits are set by the cascade control logic and read by the cascade control software.

Byte3 and Byte4 are two additional bytes of data that may be used by the cascade control software to provide an additional private communication channel between the cascade control software in each unit. This data can be configured hop by hop by the cascade control software in My_Regs and delivered to units further UP or DOWN the stack and is read from the Down_Regs. On powered down units the data from Down_Regs is copied to My_Regs directly with no change. Note that as a result of the different clocks in the system the received data is not necessarily reliable. Some data may be lost in normal operation. The cascade control software can use a simple checksum across multiple frames to detect when this problem occurs or can wait for confirmation that each two bytes have been successfully received.

In this design (as compared with that described in Donoghue et al) the size of the registers needed in the link and frame update layers is reduced; software is needed to choose the calculation path.

Determining the Primary Unit(s)

The Primary/Secondary status of the UP frame path and the DOWN frame path is chosen by the cascade control logic for a simple non-resilient stack or by software in a fully resilient stack.

In a simple stack there are two ends so primary frames are generated from both ends and both ends have the primary status for one of the paths. Note that depending on the connection made both of the ends may originate either UP path frames or DOWN path frames. The type of stack is communicated to all the units in the stack using the UP status bit in the packets read by the software from My_Up_Regs 36 and My_Down_Regs 38.

In a fully resilient stack there is only one primary unit, chosen by the software. When the software is not available the primary status is released so that another unit's cascade control software can choose the primary status.

An algorithm expressed in Verilog for calculating the primary unit in dependence on the states of the CTRL_OK_UP and CTRL_OK_DOWN signals (FIG. 3) is shown in FIG. 6.

In a resilient stack when the cascade control software in the unit with primary status notices that the stack has split it must release the primary status of the unit to allow the hardware to regain control of the primary units. If the cascade control software failed to do this then some of the remaining switches in the stack would get an invalid indication of the number of units remaining in the stack.

Unit Numbers

A simple numbering algorithm is used by the cascade control logic in both the UP and the DOWN frame paths such that the number is automatically incremented by each unit in both paths. In the simplest case these automatically generated numbers can be used to provide the switch numbers in a stack of factory default units. The numbers will increment from both ends starting at 0 in a simple stack; in a resilient stack the software must first choose a primary unit for the automatic numbering to start. The cascade control software must choose one of these numbered paths as the reference path.

An algorithm that achieves these goals is expressed in Verilog code in FIG. 7. Note that the first 'else' requires 'primary' status. The relevant features of the algorithm are the commencement of numbering from zero and the automatic incrementing of the unit numbering by units. Note the incrementing of the down_regs_UNIT_NO or the up_regs_UNIT_NO in the second 'else begin' program segment.

The cascade control software can choose one of the UP or DOWN paths to provide a unique UNIT_NO for each unit in the stack. The cascade control software can discover the MAC address and the switch number of all units in the stack using the Additional Data communication channel or the in-band communication channel. It preferably maintains a mapping table of the UNIT_NO provided by the cascade control logic, the MAC address and the switch number that the switch control software will use. These number sets may be different because the cascade control logic is at a lower logical layer than the cascade control software.

As a simple example of this consider a four unit stack where in the second unit the cascade control logic and cascade control software will choose the UNIT_NO==1 for the unit where the switch control software has a MAC address B. The cascade control software could allocate a switch number==2 for this unit. The cascade topology may change by removing the lowest unit from the stack. The cascade control logic now numbers this unit UNIT_NO==0. Because the switch control software and the cascade control logic can have different number spaces it is possible to provide in the cascade control software a mapping function that keeps the switch control software using switch number 2. Other units in the stack would recognise the cascade control logic number change and can learn the new UNIT_NO mappings for each unit in the stack by matching the unique MAC address of there existing units with the new UNIT_NO. Thus the switch Number sequence could be a number sequence with gaps caused by the removal of some units from the stack, whilst the UNIT_NO sequence is always gap free numbering from the primary unit UNIT_NO==0 to the highest unit in the stack.

IDLE

IDLE frames are sent in the absence of a primary unit in the stack. When a primary unit exists in the stack then ACTIVE frames will be sent. Secondary units in the stack pass the IDLE bit unchanged on the path. The relevant algorithm in Verilog is shown in FIG. 8.

When the state of the primary unit is changed, perhaps by the primary unit losing power, then IDLE frames are sent for a brief period to flush out active frames and ensure that a new primary unit is elected.

UP

In a simple stack both ends of the stack have primary unit status, in a resilient stack the cascade control software must first choose one unit that has primary unit status. The UP bit is set by a primary unit to indicate frames generated on the UP path and it is cleared by a primary unit to indicate frames generated on the DOWN path. An algorithm for this purpose is shown in FIG. 9.

When the state of the primary unit is changed, perhaps by the primary unit losing power, then the UP bit may be inaccurate until the new primary starts to operate.

Since each of the up and the down connectors are identical then depending on how the cascade connections are made both ends of a simple stack may be connected such that the down port is disconnected (two UP paths) or both may be connected such as the up port is disconnected (no UP paths i.e. two Down paths) or the normal case could exist where one end has the up connection disconnected and the other end has the down port disconnected (one UP path, one down path). All units in the stack will know which of these three cases exist because the UP bit is transmitted on both paths through all the units.

CHOSEN

The cascade control software sets the CHOSEN bit on one of the UP or DOWN paths. However, if the units at the end of the stack are not powered then the software cannot be used to set the bit. The cascade control logic is then used to ensure that this bit is inverted in the primary units and passed down the path. Any of the units in the stack can be elected to set the CHOSEN signal. Once the stack has become stable the elected unit can remove its selection of CHOSEN and the cascade control logic will keep the required path marked as CHOSEN without further software intervention.

Once configured by the cascade control software the CHOSEN path will perform a POWER calculation (see FIG. 12) for all units in the stack and the other path will provide the results to all units.

A Verilog expression of the program used to pass these bits round the cascade connections may be as shown in FIG. 10.

Calculation of the Maximum Number of Units in the Stack

Once a primary unit has been selected on one of the paths then the auto numbering numbers each unit in the stack. The last unit in the stack will then copy its UNIT_NO into the MAX_NO field in the packet and this will be sent to all units in the stack informing all units of the highest UNIT_NO in the stack. An algorithm for this purpose is shown in FIG. 11.

Calculation of the Units in the Stack that are Powered

The POWER[7:0] byte is governed by the algorithm expressed in Verilog as shown in FIG. 12. Once CHOSEN is configured these provide a count of the total number of units in the stack and the units that are powered. The CHOSEN path is used to make the calculation and the other path is used to send the results to all units in the stack.

Three specific primary unit cases are treated differently to secondary unit processing. In the first, the bottom of a normal stack where the My_Up_Regs in the primary unit with no Down_Control connection is CHOSEN by the cascade control software as the starting point for the POWER calculation. The second is for the bottom of a stack where for some reason both ends have the up port disconnected where the My_Down_Regs in one of the primary unit with no Up Control connection is CHOSEN by the cascade control software as the starting point for the POWER calculation. The third case is where the cascade control software chooses a unit in a resilient stack as the primary unit. In these three cases the CHOSEN path calculation is started by assigning 8'h01 to the POWER parameter (if the unit is powered).

In secondary unit processing the previous value of the POWER parameter is OR-gated with the secondary units bit to mark this unit as powered and present in the stack. In the CHOSEN path this will replace a previous "0" bit value with the units bit.

Provided that the cascade control software has correctly set the CHOSEN path it is able to access the latest version of CURRENT_POWER via an SMI-bus accessible register. This information (and the knowledge of the presence or absence of the resilient cable) can be used by all the unit's cascade control software to show how many stack segments there are in the system. The switch control software will not be able to send data packets to units that are isolated from the rest of the stack by powered down units.

The cascade control logic will be able to inform the cascade control software of the various isolated islands of traffic-passing sub-stacks. The cascade control software can then make the appropriate decisions about the systemID and other higher layer operations.

Request Data Path Healing

In the particular practical system being described units in a stack take action to heal the data path. If the reason for data path healing is a powered-down unit then all units will be aware of this since CURRENT_POWER and MAX_NO will differ. In the case of an unplugged cascade cable, the event will be detectable by adjacent units because either CTRL_OK_UP or CTRL_OK_DOWN will be set to FALSE. The frame update layer in these units should set the bit HEAL_REQ in active frames that they transmit. The frame update layer in the primary unit will copy this bit to HEAL, ensuring that all units are aware of the need to heal the cascade data path. When the originating unit sees HEAL set it should clear HEAL_REQ.

Healing the data path of the stack is also required when a unit is re-connected into the stack; thus when CTRL_OK_UP or CTRL_OK_DOWN are set to TRUE then HEAL_REQ should also be generated. The frame update layer in the primary unit will copy this bit to HEAL, ensuring that all units are aware of the need to heal the cascade data path. When the originating unit sees HEAL set it should clear HEAL_REQ.

Each unit in the stack will see the HEAL bit set. The cascade control logic copies this bit to either the HEAL_UP or HEAL_DOWN register and sets the interrupt bit. When the software reads this smi register the HEAL-UP and HEAL_DOWN bits should be cleared.

If the reason for healing the data path is that a unit has been removed from the stack then the cascade control software must take action to change the systemID used by the stack. This event is detected by the cascade control software when it validates the new topology following a healing process.

For an example of the action of the switch control software in healing the data path reference should again be made to FIG. 2B, wherein Unit 3 is powered-down.

Unit 2 heals the ring by forwarding on-going packets from ports A and B to ports C and D (where port A is the leftmost port).

Unit 4 heals the ring by forwarding on-going packets from ports C and D to ports A and B.

Unit 1 must also take action because normal packet lookup and forwarding must only be performed on ports A and B. Ports C and D must be configured in a by-pass mode that does not engage the lookup-engine. This avoids the condition where packets received on ports C and D are hashed for transmission on ports A and B. Such packets could circulate indefinitely. A by-pass mode is described in Donoghue et al, supra.

Additional Data Algorithm

The two additional data bytes provide a separate communication channel for the cascade control software. This communication channel is hop by hop. It remains open even through powered down units. An algorithm for this is shown in FIG. 13.

The cascade control software can place two bytes of data in My_Up_Regs_Additional_Data field. When the second byte is written to the SMI registers the cascade control logic will change the value of My_Up_Regs_AD_CHNG to signal the update to the far end. The cascade control software then waits for the up_regs_Additional_Data to be updated. In the next powered unit in the stack a packet received from down_regs_Additional_Data should be copied to my_down_regs_Additional_Data perhaps unchanged until the first cascade control software receives its own packet back.

Details of Normal Data Flow using Additional Data

Each packet should have a unique identifier. One possibility is to use the first byte as the unique identifier, for example using the originator UNIT_NO and a sequence number {UNIT_NO,Sequence_Number}. One of the advantages would be that even in the case of a failing stack with powered down units the cascade control software could still communicate with other units. This would enable the software to detect any failure condition. An idle packet could be defined as {UNIT_NO,0xF} reducing the range of sequence numbers used in normal operation and using predefined numbers (like 0xF) for specific purposes.

A more complex proposal is to use the Additional Data to control the operation of the powered down hardware. The cascade control logic in the powered down unit would pass the Additional Data as normal but would scan the packets for a specific pre-defined marker sequence not normally transmitted in the packets (for example {UNIT_NO, Sequence_Number=0xE} where the Sequence Number used in normal operation by the cascade control software would never be set to 0xE). The following data could be used to load registers in the cascade control logic of the powered down. unit. This is not restricted to just one powered down unit since the second byte of the Additional Data allows for an additional addressing mechanism (for example {Powered down UNIT_NO, data}).

Specific Sequence Numbers reserved for use are shown in the following Table 1.

TABLE 1

| Number | Description |
| --- | --- |
| 0xF | Idle Additional Data |
| 0xE | Alert for a specific unit in the stack, either powered down or powered up - second byte of Additional Data indicates the target unit and the data. |
| 0x0 through 0xD | Sequence numbers used by the originator to identify this packet. |

To ensure that both units in this hop-by-hop communication get the opportunity to pass packets each can send Data followed by Idle Additional Data. When the receiving unit receives the Idle Additional Data it may return Idle Additional Data to the originator or return Data. Alternatively a simple on/off protocol can be adopted.

The cascade control software can use My_Up_Regs_ UNIT_NO to act as a unique identifier for Additional Data packets that it sends on the DOWN path and My_Down_ Regs_ UNIT_NO for Additional Data packets on the UP path. Alternatively, when it starts to receive packets with the CHOSEN bit=TRUE either in the UP path or the DOWN path it can use the chosen path's UNIT_NO in both directions.

Starting Additional Data Transfers

Consider the worst case when two adjacent units attempt to set the CHOSEN signal and in a resilient stack also attempt to become the primary unit. The first packet from both these units may have the same {UNIT_NO,Sequence Number} in both directions. If one of the units starts to send this first packet before the other then the second unit can detect that it has a duplicate UNIT_NO and release its attempt to become the primary unit. If both send at the same time then the contents of the packet contains the MAC address of the originating unit, this is globally unique and is used to determine which should become the primary unit. The receiver of the first frame can check its own MAC address against the received MAC address and the smaller one wins. If the packet becomes corrupt or fails to transfer then the transmitter can try again after a pseudo random backoff, until the hop-by-hop connection is established.

Error Conditions

Various error conditions can be detected or indicated by the cascade control software.

If there are too many units (more than eight in the particular example) in the stack, the cascade control logic will set MISCONFIG_REQ when a slave unit detects down_regs_ UNIT_NO==7 or up_regs_UNIT_NO==7. The primary unit will then signal this to all other units by setting the MISCONFIG bit. When the originating cascade control logic sees UNIT_NO==7 error condition being removed it must remove MISCONFIG_REQ.

In a resilient cascade when the cascade control software get an interrupt that indicates IDLE frames it will read both my_up_regs_IDLE== TRUE and my_down_regs_IDLE== TRUE. The software must choose a unit to become the primary unit perhaps using the Additional Data communication path.

If a unit leaves the stack, the cascade control software in all units will be interrupted by the HEAL event and the change in UNIT_NO either in the UP or DOWN frame paths.

If a unit joins the stack, the software in all units will be interrupted by the change in UNIT_NO either in the UP or DOWN frame paths.

If the stack splits, the software in all units will be interrupted by the HEAL event and will notice a change in UNIT_NO either in the UP or DOWN frame paths.

If the primary unit in a resilient stack powers down the software will get an interrupt indicating the POWER change and will also get an IDLE frame interrupt. It will read both my_up_regs_IDLE==TRUE and my_down_regs_IDLE==TRUE. The software must then choose a unit to become the primary unit in any convenient manner, for example using the Additional Data communication.

Cascade Data Signals

Figure 15:
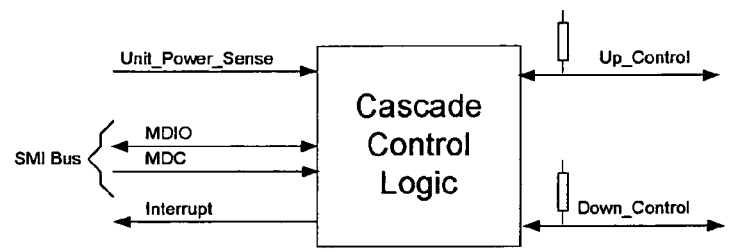
FIG. 15 illustrates some external connection for the cascade control logic.

FIGS. 14 and 15 illustrate schematically the principal elements of a switch unit and the cascade control logic. The general structure corresponds to that described in Donoghue et al, supra and will not be described in detail. Broadly the switch has a multiplicity of ports for sending and receiving data packets with respect to an external network. As is also described therein the switch is for convenience constituted by four switch modules (SM) which are interconnected by high-speed links.

The cascade data signals (i.e. data packets which are directed by the switching engine of a unit) are provided, in this example by embedded serializer/deserializers (SerDes) in the switch modules SM. The signals pass out through a cascade connector. If passage through these connectors impairs signal quality then signal re-timers may be needed. The cascade data signals form a connection for all traffic that goes into and out of the switching engine of each unit. In addition the cascade data signals provide an in-band path for the cascade control software to communicate between units in the stack. This is achieved at start-up of the unit by the cascade control software that can configure the switch modules SM to send cascade control packets from the CPU to the cascade data path each with a specific SMA (Stack Management Agent) multicast MAC address. The cascade control software can configure the switch modules SM to filter all packets received from the cascade data signals except those with the specific SMA multicast MAC address. In normal operation of the cascade the cascade control software allows the switch control software to control the filtering of packets on the cascade data signals.

Cascade Control Logic Implementation

The switch unit also contains the cascade control logic 30 which is coupled by way of an SMI (Serial Management Interface) bus to the CPU and also provides interrupts to the CPU. The SMI includes MDIO (Management Data Input/ Output) and MDC (management data Control) line, for example in accordance with IEEE Standard 802.3-1998 Clause 22. The cascade control logic derives its power from a shared cascade VCC power line. This allows the cascade control logic of a powered-off unit to participate in unit numbering. The input Unit_Power_Sense indicates to the cascade control logic whether or not the unit is powered up.

The cascade control logic may be implemented as an FPGA (Field Programmable Gate Array) disposed on a cascade downlink card The cascade control software is able to configure and view registers internal to the cascade control logic. The registers contain information such as the unit number, the List of Active Units and the cascade link status. The cascade control logic is able to inform the CPU of an urgent event via an interrupt signal. If the power goes down then the assumption is that the SMI interface will prevent the CPU corrupting the cascade control logic registers.

Cascade Control Link Level Implementation

The cascade control logic Up_Control and Down_Control signals are coupled out on open-collector bi-directional half-duplex serial links.

Usually the Up_Control signal of a unit is connected to the Down_Control signal of a unit "above" it in the stack, in a simple series fashion. Signalling on the bi-directional links will initially have a peer-to-peer relationship using a simple collision detection mechanism to determine the master-slave relationship. This is negotiated by the link layer as soon as the connection is established.

Master/Slave Negotiation

Figure 16:
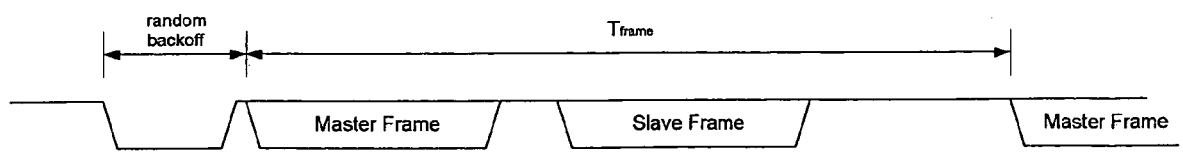
FIG. 16 illustrates a cycle of control frames.

Both ends of the link hold low the control line for a pseudo-random time greater than 10 $T_{bit}$ and less than 20 $T_{bit}$. Following this they release the line and attempt to send a master frame on the link and receive a Slave frame (FIG. 16). The Link Level that holds the control line low for longest becomes the link master and this role is maintained until the Link Level fails for some reason and the link is renegotiated. Detection of a Slave frame indicates successful establishment of the master slave relationship. Once the role is established there is no need to continue the pseudo-random master/slave negotiation.

If both pseudo-random times happen to be the same then both attempt to send a master frame and neither receives a slave frame. In this condition the link has not been established and the negotiation is re-attempted. On second and subsequent attempts the pseudo-random generator is such that at some point one of the partners will become the master for the link.

In event of a mis-configuration of the cable connections it might be possible for an Up port to be connected directly to a Down port on the same unit. In the event the Link Level will always fail to gain link master because both the Up and the Down pseudo-random time is generated by the same source and the Link Level then will never detect a Slave Frame.

Link State Machine

Figure 17:
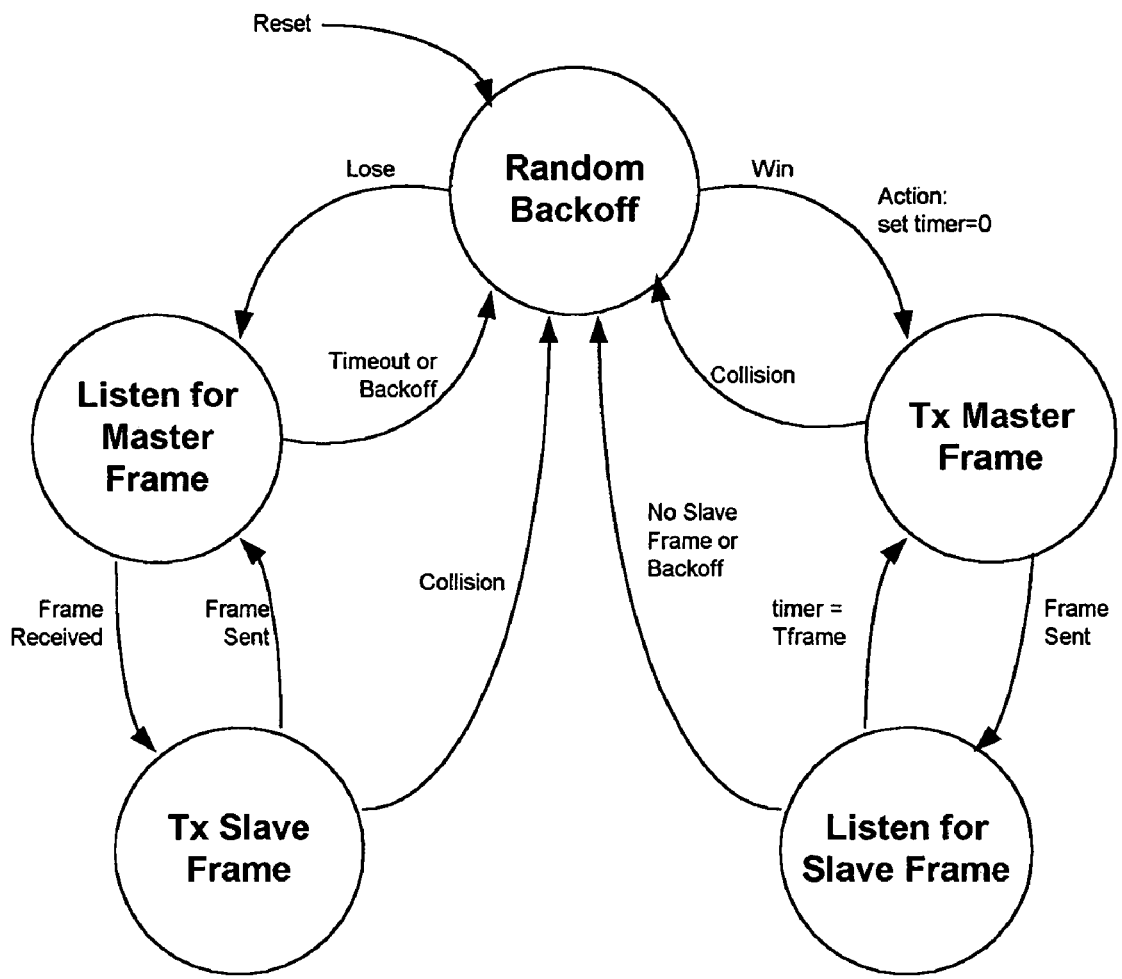
FIG. 17 is a state diagram.

The Link State Machine has five states and is illustrated in FIG. 17.

A Reset forces the state machine into the Random Backoff state. The unit that wins random backoff (see above) will transition to the Tx Master Frame state.

The link sends a master frame in the Tx master Frame state. If transmission is successful, the state machine will transition to the Listen for Slave Frame state.

If a slave frame is observed in the Listen for Slave Frame state then master-slave negotiation is successful. From then on the state machine will continue to swap between Tx master Frame and Listen for Slave Frame states.

The unit that loses the random backoff contest will transition to the Listen for master Frame state. If a master frame is received then the state machine transitions to the Tx Slave Frame state.

The link sends a slave frame in the Tx Slave Frame state. If transition is successful then master slave negotiation has been successful. The state machine will then continue to swap between Listen for master Frame and Tx Slave Frame.

Control Frame Transmission

Transmission of frames alternates between the master and slave. As is shown in FIG. 18, each frame consists of a preamble followed by the data payload.

The preamble consists of the sequence 10101010. The chips (channel bits) of the preamble are $T_{bit}/2$ (1 us) in length, half the length of the normal data bits. Hence the preamble constitutes a unique sequence not found in the data.

The preamble is followed by 8 data bytes (each with an odd parity bit). The data bits are $T_{bit}$ (2 us) in length. The line is driven low for 2 us at the end of transmission, after which it is tri-stated. The duration of each frame is therefore 154 us.

The master transmits a control frame every $T_{frame}$ (400 us). The slave transmits a control frame $4*T_{bit}$ (8 us) after receiving the master's control frame. The end of the frame is defined as being the end of the 2 us 'idle low' period.

At time $T_{update}$ after reset and every $T_{update}$ thereafter CTRL_OK_UP and CTRL_OK_DOWN are evaluated. CTRL_OK_UP is set to TRUE if at least one Slave frame has been received on Up_Control in the preceding $T_{update}$ (otherwise it is set to FALSE). Similarly, CTRL_OK_DOWN is set to TRUE if at least one frame has been received on Down_Control in the preceding $T_{update}$.

Frame Reception

Since each of the units in the stack is in practice running from a different crystal-controlled clock and on each end of the cascade connection either of the units' cascade control link layers may become the master for each cascade connection then over time the reception of frames may drift relative to the processing of the frames. The link layer should take this into account and provide buffering such that the frame written to Down_Regs (FIG. 3) is stable. The effect will be that occasionally the frame processed by the frame update layer will be either old information previously processed, or a frame will be lost. This has little impact since in normal operation all the frames processed by one frame update layer will be the same and when a change takes place the change will change the contents of the control frame for many frames.

Cascade Control Software

General

There are some failure conditions that the cascade control logic cannot resolve. The cascade control software may be used to resolve these conditions without user intervention in an automatically configured stack.

One example of this is to find a primary unit in a fully resilient stack. An important requirement for each unit in the stack is that they each have a unique MAC address. The cascade control software can independently communicate between the units in the stack provided that the cascade data path is operational between the switches. The MAC address can be used as a unique value to resolve various error conditions. For example in a factory default fully resilient stack, the unit with the lowest MAC address will be selected to act as the stack primary unit.

A second important requirement is that when a stack change occurs there should be a minimum amount of disruption to the switch numbers. Thus in an existing stack where one or more units are powered down or removed from the stack and the other units are for example power cycled the switch numbers should remain un-changed provided the stack remains connected in the same sequence but with gaps.

The cascade control software can use the presence of powered down units provided by the cascade control logic and the number of units that would be affected by a given change to provide a best effort attempt at re-numbering the units in a stack.

A third key requirement is that there should be an additional mode where the user can configure the switch numbers by hand (manual configure). The underlying assumption is that each unit in a stack is mounted in a simple rack mount and that the user makes a simple connection between each unit in the stack in a logical order. Clearly there are many failure conditions that could be generated if either mixed manual or automatic units were mixed in a stack or one unit was removed from the middle of a stack and more than one unit returned to the stack. The cascade control software can either detect these failures or make it clear to the user using the units LEDs or messages on the console port after they have made the physical changes to the stack that some action is needed. In an automatic numbered stack some of these failure conditions will result in more units being renumbered than may be strictly necessary, however when these major changes are being made to the stack it is assumed that the user will expect to see the unit numbers changing and will be on hand to correct any undesirable changes.

Communication Between Units in a Stack

Whenever unit numbers are not configured, or are incorrectly configured in all or part of the stack, the cascade control software will configure all switches in the stack to discard user data frames that are due to be sent to one of the incorrectly configured units in the stack. The only traffic allowed on the cascade data path to these incorrectly configured units is traffic sent between the cascade control software running on units in the stack. Two communication paths are available to the cascade control software: The In Band path is used where the cascade control software will use the specific SMA multicast MAC address to send packets between itself and its powered up neighbours; The Additional Data path is used by the cascade control software to send packets between itself and any neighbours connected via unpowered units. In this way the cascade control software can communicate with any powered unit in the stack.

Overview of the Cascade Control Software Communications

The packets generated by one unit can be passed round the stack till they return to the unit again. If the contents of the next packet to transmit is the same as previously sent then transmission will stop. In a simple (non-resilient) stack the unit will receive the packet from the direction that it sent it in. The unit can then send it in the opposite direction till it receives it back again. The most important packet to deliver is the packet with the lowest MAC address. This packet confirms the master unit so whenever the cascade control software has a choice it must deliver this packet first.

Once the switch numbers have been successfully configured the cascade control software will allow the switch control software to forward user data frames between units in the stack. The cascade control software can also store the value of CHOSEN, the switch numbers and topology information in flash memory so that when next the stack is powered up the previously used unit numbers, even for an automatically configured stack, can be configured thus reducing the need to re-run the automatic configuration algorithms.

At start-up if the switch control software discovers previously allocated switch numbers in flash memory on start up and the cascade control logic instructs the software that there are the same number of units in the stack as previously and the CHOSEN signal is correctly set then the software can assume that these are valid switch numbers until proven otherwise and can attempt to discover the other units in the stack to confirm the topology more rapidly by sending SMA packets to each unit in the stack using the In Band connection, or the out of band Additional Data path in the event of a neighbouring powered down unit. The cascade control software can confirm the topology by sending the cascade control packets on these data paths or can detect that the data path is broken (if it receives no packets from its neighbours) or there is a mis-configuration.

Finally once the unit numbers and the data path have been confirmed the cascade control software will cease the exchange of cascade control logic state and rely on the cascade control logic to interrupt the CPU if the stack topology changes.

Cascade Control Software Packet Contents

These packets preferably contain at least the 20 bytes of data shown in Table 2 below plus a check sum for the packet (check sum not shown):

TABLE 2

|  | Byte 7 | Byte 6 | Byte 5 | Byte 4 | Byte 3 | Byte 2 | Byte 1 | Byte 0 |
|---|---|---|---|---|---|---|---|---|
| Bytes 16-19 | additional | additional | additional | additional | UP_MAC5 | UP_MAC4 | UP_MAC3 | UP_MAC2 |
| Bytes 8-15 | UP_MAC1 | UP_MAC0 | DWN_MAC5 | DWN_MAC4 | DWN_MAC3 | DWN_MAC2 | DWN_MAC1 | DWN_MAC0 |
| Bytes 0-7 | OWN_MAC5 | OWN_MAC4 | OWN_MAC3 | OWN_MAC2 | OWN_MAC1 | OWN_MAC0 | FLAGS | UNIT_NO_DATA |

The cascade control software in each unit preferably exchanges with cascade control software in the other units in the stack cascade control packets that contain MAC address and associated cascade control logic state information with its neighbours and build up a picture of the topology in a mapping table based on the units currently present in the stack, the link speeds between each unit in the stack and the "Distance Between Units" calculated in terms of "hops" (or the hops/speed of the links) between neighbours.

It will maintain this topology and monitor the cascade control logic state information to detect changes in the membership of the stack.

In Table 2, UNIT_NO_DATA refers to the units own unit number information. 'Flags' means CCL flags. These are discussed below.

The OWN_MAC fields are 6 bytes of Own MAC address or FF:FF:FF:FF:FF:FF to identify the packet with the SystemID The DWN_MAC fields are 6 bytes of MAC address of the unit connected to the DOWN port or a sender MAC address for the SystemID The UP_MAC fields are 6 bytes of MAC address of the unit connected to the UP port (May be 00:00:00:00:00:00 during initialisation) or sender MAC address for the SystemID packet.

Both the DWN_MAC and the UP_MAC filed may be 00:00:00:00:00:00 during initialisation.

The 'additional' fields refer to additional data bytes not required in the minimum size packet. These bytes may include link speed information. Presence of this information is indicated by the length of the packet. The data is encoded as Type, Length, and Value (TLV) items.

A CheckSum is required to ensure that the packet contents are valid since as noted in elsewhere the Additional Data path may corrupt some packets by losing a byte, owing to the (slight) difference in clocks of each unit in the stack.

When communicating on the in-band communication path (i.e. the path for ordinary data packets) the source MAC address of the packet will also be OWN_MAC. The destination MAC address may be either the SMA multicast address or the MAC address of the destination unit. The packet may also contain any additional data needed to accelerate the topology discovery. Communication on the Additional Data path the communication has to be kept at a minimum because the transfer of data is slower and more CPU intensive since each byte transferred will interrupt the CPU.

When OWN_MAC==FF:FF:FF:FF:FF:FF the contents of the packet change to allow the SystemID to be negotiated with all units in the stack. If COMMAND==TRUE and CHOSEN==TRUE this packet contains the SystemID: UP_MAC==SystemID; DWN_MAC==MAC address of sender unit; other fields are ignored.

UNIT NO DATA and FLAGS fields.

Table 3 below shows the bit fields for the two UNIT_NO_DATA and FLAGS bytes shown in the above cascade control software Packet contents diagram.

If COMMAND is FALSE then each byte in the cascade control packet is originated by the source unit. If COMMAND is TRUE then this is an instruction from the elected master unit to the unit with MAC address OWN_MAC to change its switch_Number to the specified value and store this in flash memory or to isolate itself from any user data traffic on the cascade connections. Other fields represent the masters copy of the last packet received from the slave.

Additional Information Encoding

When the packet can be sent via the inband communication path the transfer between units may be at 20 Gbps rate so the cascade control software can easily extend the packet size with other information. This information will be removed by a switch that has to pass the packet contents via the out-of-band communication path. This additional information is not of use to a part of the stack that is isolated by a powered down unit from the sender unit. The following Type Length Value items are identified for the additional information:

The type value is 1 byte in size the Length value is 3 bytes in size and is the length in bytes of the whole TLV item.

The link speed may be used in a stack where units are connected via different speed cascade data paths. It is used to help calculate that the fastest path to the destination unit for user data traffic. The time taken to reach a given destination unit in the stack is equal to the sum of the individual link times (1/link speed).

Communication of the SystemID to All Units in the Stack

When OWN_MAC==FF:FF:FF:FF:FF:FF the packet contains the SystemID. The master switch determines the SystemID and then uses this packet to send the selected Sys-

TABLE 3

|  | Bit 7 | Bit 6 | Bit 5 | Bit 4 | Bit 3 | Bit 2 | Bit 1 | Bit 0 |
| --- | --- | --- | --- | --- | --- | --- | --- | --- |
| FLAGS |  | COMMAND | OWN_ISOLATE | OWN_HARD | OWN_CONFIG | PRIMARY | CTRL_OK_DOWN | CTRL_OK_UP | CHOSEN |
| UNIT_NO_DATA |  |  | switch_Number |  |  | OWN_UNIT_NO |  |  |

In Table 3, UNIT_NO refers to the UNIT_NO on the CHOSEN path (0-7). If CHOSEN==FALSE this is the larger of my_up_regs_UNIT_NO and my_down_regs_UNIT_NO.

CHOSEN is TRUE if either my_up_regs_CHOSEN==1 or my_down_regs_CHOSEN==1. Otherwise it is FALSE, and indicates that the cascade control software in at least one unit has chosen a reference path.

CTRL_OK_UP is TRUE if the cascade control logic on this unit has CTRL_OK_UP==1 so there is a unit connected to the UP port.

CTRL_OK_DOWN is TRUE if the cascade control logic on this unit has CTRL_OK_UP==1 so there is a unit connected to the UP port.

PRIMARY is TRUE if the cascade control logic on this unit has OWN_PRIMARY==1, only used in a resilient stack.

The field 'switch_Number' (0-7) is the switch number used by the switch control software. If OWN_CONFIG is FALSE then this represents an attempt by the cascade control software in this unit to negotiate a new switch number.

OWN_CONFIG is TRUE if the switch number was recovered from flash memory or has been stored in flash memory.

OWN_HARD is TRUE if the switch number was set by the user.

OWN_ISOLATE is TRUE if the unit that originates this packet has isolated itself from the stack.

temID to all units in the stack. The master must attempt to keep the SystemID the same as that currently in use to reduce the disruption in the network. It must be globally unique so one of the units in the stack provides its MAC address as the SystemID for the stack as a whole. It does not need to be kept the same following the power cycle of the whole stack, so it is not stored in flash memory.

It is possible that the master unit has just power cycled in the stack and has no knowledge of the SystemID that was being used by the old master unit. To gather the information about the current SystemID in use in the stack the master sends out a packet with its first attempt at the SystemID (based on the lowest MAC address of all the units in the stack i.e. its own MAC address) and CHOSEN==FALSE. Each non-master switch will receive this and can respond with a different SystemID if appropriate. The master unit will then gather all the responses from the slave units, make the final choice of SystemID and send this to all units with CHOSEN==TRUE. If the non-master has also been reset it will have no knowledge of the SystemID and should respond with SystemID==00:00:00:00:00:00.

Packet Contents During Switch Number Allocation

At start up, these packets are sent to all units in the stack from all units in the stack. The main purpose of this is so that the master unit can be selected. In a resilient stack this also becomes the primary unit. This unit will choose the CHOSEN path. The master unit in a resilient stack can save the primary flag in flash memory so that on future power up or reset it can claim the primary status sooner. As all the packets from all units get delivered to all units in the stack and the lowest MAC address packet will be passed in preference to any other then and the algorithm to determine the master unit is the same in each unit then it follows that the master unit status is rapidly confirmed.

As soon as the master unit is confirmed the CHOSEN path will be confirmed and the UNIT_NO reported by each unit becomes valid. Thus in the worst case the Mapping Table will be complete with initial switch number allocations and unit sequence after the second packet sent from each units cascade control logic. If the CHOSEN path has not been confirmed then it is likely that the CHOSEN signal read from the cascade control logic in any one unit will oscillate between my_up_regs_CHOSEN and my_down_regs_CHOSEN.

In addition the MAX_NO value generated by the cascade control logic becomes valid in all units after the CHOSEN path has been confirmed. This will confirm the size of the stack to all units and allow sensible packet delivery strategies to be implemented based on the number of hops to the destination unit.

As soon as the master unit has been selected it will send a single packet to each unit confirming the information that each unit has sent to the master unit. This packet will be passed on either the In Band or Additional Data path directly to the slave unit. Only when both the present record and the receive record from the master unit match, will the slave units stop sending packets to all units. Thus the last packet from the slave to each unit will be received by all units and will refresh the Mapping Table of each unit with the latest slave information configured by the master.

The master unit will send a response to a slave unit whenever it receives a packet from a slave unit that contains a changed record. Whenever a slave unit detects a change in its state it will send an update to the master unit.

Mapping Table

Mapping Table Overview

The Mapping Table contains an entry for each unit in the stack. It provides and method of linking the switch number used by the switch control software and the dynamic hardware allocated UNIT_NO. The Mapping Table works because the switch control software has a global unique MAC address allocated to it. The MAC address used in any one unit is not duplicated in any other network attachment and provides a unique way to identify the switch.

Mapping Table After Reset

Each row of the Mapping Table following reset will be restored from flash and will contain at least the MAC address of the switch, the switch number and other flags previously learnt (see section 0) and its Powered status (learnt from CURRENT_POWER once master unit selection is complete). In addition each row contains a "VALID" flag that on reset is FALSE for each entry.

Verifying the Mapping Table

The cascade control software will first ensure that the cascade control logic is configured correctly, then will populate the Mapping Table with the new UNIT_NO values learnt from the cascade control logic. This information either flows via the in-band or out-of-band connections using the cascade control software Packet. As packets are exchanged between each switch in the stack the new topology is learnt and each entry in the mapping table is updated with the latest information from the stack updating the "VALID" flag for each row at the appropriate packet is received. As the table is updated a count is kept of any new switches in the stack (using the MAC address as the key to the table and also allowing old row entries to be identified).

The Mapping Table entries are stored in the order of the switch numbers. If this is a new stack then the order will not at first be defined, however once the master unit has been selected the order will be defined by the CHOSEN path. In an existing stack with a new master the CHOSEN path may have been altered. If this is the case then the UNIT_NO values may appear in reverse order, but the switch numbers need not change.

Selection of the Master Unit

Each unit checks the MAC addresses contained in other cascade control software packets (only taking account of packets from source, i.e. COMMAND ==FALSE). When it sees one that is lower than its own, it will relinquish any attempt to become the master unit. At each hop the packet with the lowest MAC address is transferred to the next switch in preference to any other packet. The unit with the lowest MAC address is likely to receive its packet back first having passed through all the switches; it can then attempt to become the master unit of the stack. Once all cascade control software packets have been transmitted and received by all units, each unit will be able to independently determine whether or not they are the master unit for the stack.

Completion of the Mapping Table

As soon as the master unit has been elected, it will select CHOSEN and then the MAX_NO calculation will be valid and will enable each unit to determine the maximum size of the stack and thus when all the cascade control software packets have been received.

Note that old entries in the Mapping Table may be removed if they have not been validated and contain switch numbers that already exist in the new stack. Old entries that have not been validated and do not have conflicting switch numbers may be left in the mapping table but should be ignored until the switch is re-connected into the stack in its old location.

If a unit is power cycled in the stack then all units in the stack will be able to identify the unit that has been power cycled because the CURRENT_POWER byte will have a bit cleared for each unit that has no power. The Mapping table entry for a powered down unit is still VALID but cannot be taken into account for the master unit calculation since if one unit has its power down and a second is power cycled, the second unit will not have the powered down units entry validated.

If one (or more) unit has no power and a unit leaves the stack whilst in this state the simplest thing is to set VALID=FALSE for every entry in the table because its may not be possible to determine which unit has left the stack. The mapping table is then re-validated in the usual way.

If there are powered down units in the stack and the user attempts to perform manual configuration then they may be warned by cascade control software of the possible failure to detect duplicate switch numbers and auto number/manual number conflicts when the powered down switches remain unreachable.

Software and Hardware Interaction

The system will use a combination of software and hardware to monitor the stack's state and to determine/assign switch numbers in a stack.

When a stack is power cycled, the following briefly describes what happens:

The software inserts any previous switch number into its entry in the Mapping Table.

If the Unit was previously the master then it re-asserts its master role and selects the CHOSEN path (perhaps UP_CHOSEN path or that saved in flash from a previous session). If it were previously in a resilient stack it checks to see if it is still a resilient stack (IDLE frames on both paths) and re-asserts it's primary role.

The hardware attempts to determine suitable UNIT_NO assignments based on the selected primary unit.

If the hardware determines a successful configuration, the software will confirm it using the cascade control software Packets. Where no switch numbers exist the cascade control software may use the CHOSEN UNIT_NO as the basis for the auto numbering of the switch numbers.

Once the stack is stable and the software has confirmed the stack topology then it will save the switch numbers and the Mapping Table and the value of CHOSEN path that it reads from the cascade control logic in FLASH for future use.

Once the stack is stable the master unit can release OWN_UP_CHOSEN because the cascade control logic will hold this value in the cascade control path till the stack requires a new master to be selected.

The only condition that will result in a failed configuration is if the user has more than eight units connected in the stack. This will result in units being isolated. The software will display a visible error condition to alert the user. The user should be encouraged to remove the units from the stack since the cascade control logic is designed to power the cascade logic in only seven powered off units.

The first time a stack is commissioned this negotiation process may take longer (particularly if there is a resilient cable installed) as a master unit needs to be established, but for subsequent power cycles of switches or whole stacks the number allocation will be a formality since at start up the software can provide the correct switch numbers and CHOSEN path for the switches at start up prior to the start of the main software.

FIG. 21 shows the various states and events that may occur during initialisation.

The 'Read CCL registers' state will be entered when a unit or stack is reset/powered on or the HEAL flag or POWER register changes. The cascade control software attempts to determine the current stack topology by examining the CCL registers. The following can be determined: (a) Existence of a resilient connection; (b) How many units exist in the stack (c) Power state of units in the stack; (d) Invalid wiring configurations.

The 'Elect master' state will be entered when either the stack is a newly established stack, which will not have a previous master unit, or when two or more units think they are the master unit. This is an error condition that can occur when non-default unit/s are added to an existing stack.

All units transmit cascade control frames, using either the 'in-band' or 'additional data' paths, advertising their own MAC address. The unit with the lowest MAC address becomes the master unit.

The 'Stable' state will be entered when a master has been established and there is no contention from any other units in the stack. All units except the master unit have stopped sending packets. The master unit selects the SystemID for the stack.

Hardware Interruptions

Once a stack has been established, the hardware will monitor the system and alert the cascade control software of any system state changes using the interrupt mechanism. When an interrupt is fired the cascade control software will examine the CCL registers to determine any state change. The error conditions that can be detected by the cascade control software have been discussed previously. The cascade control software will use the various events to reconfigure the stack switch Unit numbers, systemID and data forwarding path as necessary. The cascade control software will always make a best-effort attempt to reconfigure the stack without rebooting, however if an irrecoverable conflict is discovered, the cascade control software may reset the stack to allow the conflict to be resolved.

Summary of the Required Actions for the Cascade Control Software

This section is a summary of all the conditions that the cascade control software may handle.

The cascade control software must select the master unit; this may also be the primary unit in a resilient stack.

The In band connection should be used as much as possible to exchange cascade control software Packets. Only when a neighbour unit is powered down should the Additional Data path be used.

On the In band connection at the end of a stack the cascade control software should ignore any looped back Additional_Data since there is no next hop.

The master unit must select the CHOSEN path to select the reference UNIT_NO scheme and enable the calculation of powered units. When the cascade control software uses the UNIT_NO as a seed to auto number the switch number the CHOSEN path affects the user visible auto switch number scheme adopted.

If the master unit is in an existing stack (i.e. one where it has a record of more than half the new stack from flash memory) then it should use the original value of CHOSEN stored in flash. This is either the value it used previously or the value that the previous master unit used.

If this is a new unit and the stack is not resilient (both up and down paths will have active frames) then the master should read my_up_regs_UP and my_down_regs_UP and if they are different can choose the CHOSEN to follow the path originated on the UP path (see the paragraph below for a discussion of this). In an existing stack then the new master may be able to read the value of CHOSEN from the cascade control logic of the previous master. Otherwise the master will just choose its own UP path for the reference path (UP_CHOSEN). If the CHOSEN path is changed the switch numbers need not change and the Mapping Table will isolate the switch numbers from any change in the reference UNIT_NO scheme chosen.

In normal operation with the cables plugged correctly from the UP port of one unit to the DOWN port of the next unit then the cascade control software in every unit will see my_up_regs_UP=TRUE and my_down_regs_UP==FALSE. The cascade control software in the lowest powered unit (perhaps the one with my_up—regs_UNIT_NO==3) can force the UP_CHOSEN signal to be true and this will propagate to all units in the stack on the UP path. If this unit has the Up and the Down connections crossed, it will still see one of my_xx_regs_UP==TRUE, this is the path that should be chosen.

The cascade control logic will use the OWN_XX_CHOSEN signal (either OWN_UP_CHOSEN or OWN_DOWN_CHOSEN) to identify the path as the one to do the NEXT_POWER calculation on. The other path will be used to send the results of the NEXT_POWER calculation back down the stack to each powered unit. When the CHOSEN signal reaches the top of the stack it is inverted and copied down the stack on the other path by the cascade control logic. On reaching the bottom of the stack it is again inverted and passed back to the originating unit. At this point the originating units cascade control software can clear the OWN_xx_CHOSEN signal with no effect on the CHOSEN signal that will now propagate up and down the stack until the next topology change. In a resilient stack the cascade control software must choose the primary unit and this unit must ensure that UP_CHOSEN==TRUE and DOWN_CHOSEN==FALSE to ensure that both control paths have the correct value.

Once configured the CHOSEN path will perform the NEXT_POWER calculation for all unit in the stack and the other path will provide the results to all units.

In any unit in the stack the port (either UP or DOWN) that receives the packet with CHOSEN set is the port that data packets need to be sent on to reach a lower unit in the stack. The switch control software must be instructed of the shortest path to get to a particular unit in the stack by telling it which of the two connections to use for that remote unit.

When the stack is stable each unit should store the chosen path this will introduce fewer changes when the stack is re-started. For example unit 0 may be connected to unit 1 normally so the chosen path is my_up_regs_CHOSEN, but unit 2 may be connected to unit 1 with the up port rather than the down port so unit 2 sees the chosen path as my_down_regs_CHOSEN. When the stack is stable these roles (chosen==up or chosen==down) are stored so that if the primary unit in a stack has to be changed the software in the new primary unit can read the stored role and use the same value with the new configuration. This is not essential since the Mapping Table can also be used to ensure that the switch numbers are not affected.

Consider what happens when a stack cable is removed above the unit. First the unit either side of the failed cable notices the lack of slave frames at the link level so CTRL_OK_UP or CTRL_OK_DOWN signal the hardware to loop the data frames. HEAL bit is set in all units. Also the UNIT_NO register will change at least in one direction. The cascade control software must check the MAX_NO and CURRENT_POWER registers to check the new size of the stack.

Consider what happens when a unit power fails. The CURRENT_POWER register will change, all units will see this register change and will heal the data path accordingly to prevent user data traffic from being sent through a powered down unit.

Consider what happens when the software in a unit fails. The additional_data transfer between adjacent powered units may fail, this may occur across un-powered units so that normal in band communication channels would not detect this failure, but the additional_data channel could be used to monitor this event. The cascade control software can alert the user.

Consider what happens when an administrator swaps a unit or cables quickly. The hardware will react very quickly, the cascade control software should capture the state of the cascade control logic registers in the interrupt service routine so that temporary loss of units from the stack are noticed and the appropriate action taken.

Consider what happens when a single unit comes up following a power cycles of a single unit in the stack. The cascade control software can detect that the stack is stable using Additional_Data to confirm with neighbours, it can learn CHOSEN path from the registers and can learn the current topology from all its neighbours.

In a manually configured switch number stack two switch numbers may be the same. The cascade control software will isolate all but one of the duplicate numbered units. The isolated units my pass user data traffic between the cascade ports, but the user data traffic from front panel ports must not pass over the cascade connection. The cascade control software could number the switch modules with spare switch numbers to allow this to occur, but the switch control software must not use these hidden switch numbers to send user data traffic to an isolated unit.

Once the switch numbers have been allocated the cascade control software will choose a SystemID for the stack. It should follow the algorithm detailed in section 0 to ensure that all units in the stack have the same systemID and that the SystemID will remain constant even when unit in the stack are power cycled. If a unit leaves the stack then the SystemID may have to be changed particularly if the unit that leaves the stack may have been providing the MAC address that is being used by the stack as the SystemID. Reliable information about when a unit leaves the stack (even if that unit is powered down) is obtained from the cascade control logic.

CCL Operation Examples

Consider the resilient four unit stack labelled 'Normal Operation' in FIG. 1A. Assume that the units are first powered up simultaneously. The link layers in each unit will exchange idle frames every $T_{frame}$. At time $T_{update}$ CTRL_OK_UP, CTRL_OK_DOWN will be evaluated as TRUE. As a result the Transport Layers in each unit's CCL will set up the control data paths without loop-back.

At time $T_1$ the frame update layer in each unit will evaluate its primary/secondary status. Because the stack consists of factory default units and no unit has a silent down link, a primary unit will not exist. Once initialised, the cascade control software will notice the error condition and assign the lowest MAC address unit switch number 1. The other three units will be assigned incrementing switch numbers 2, 3 and 4. The lowest MAC address unit will also be the primary unit.

Non-resilient Factory Default Stack

Using the same stack, but without a resilient cable (as in FIG. 1B) will cause the bottom unit to become the primary unit and assign itself unit number 1 (H/W 0). The frame update layers in other units will identify themselves as secondary units. The primary unit will start to transmit active frames on its Up_Control line containing:
 UNIT_NO=0
 CURRENT_POWER=8'b00000000
 NEXT_POWER=8'b00000001

The next unit up the stack will receive these frames on Down_Control. It will set the following My_Regs fields:
 UNIT_NO=1
 NEXT_POWER=8'b00000011

This data will transmit this data on Up_Control. The data will progress up the stack with the next units taking UNIT_NOs 2 and 3.

When the bottom (Primary unit number 1) unit receives frames containing this data on Down_Control, it will copy:
 NEXT_POWER (8'b00001111) to CURRENT_POWER
 UNIT_NO=3 to MAX_NO This will indicate that that the stack currently consists of 4 powered-up units in the stack.

Stack Topology Change

Consider the stack in FIG. 1A again and suppose that some time after power up, someone trips over a cable and powers-down unit number 2. Since the CCL logic is powered by the cascade, the control signal path is unaffected and control frames continue to circulate. However the Unit_Power_Sense line on the input to the CCL on Unit-2 will go low. The frame update layer in unit number 2 will set its bit in NEXT_POWER to '0'. The frame field CURRENT_POWER will change in all units to 8'b00001011, indicating the lack of power to unit number 2. The CCL in all units will assert Interrupt to indicate the change in the cascade status unit numbers 1 and 3 will heal the cascade data path by looping-back the cascade data path. All units will update their forwarding tables to remove entries for unit number 2. The use of CURRENT_POWER to mask transmission of frames onto the cascade will quickly remove cascade packets destined for unit number 2.

The network engineer will eventually notice the problem and will plug the power cable back into unit number 2. The CCL in units all units will identify that Up_Control and Down_Control are now active and that power has been returned to unit number 2. CURRENT_POWER will be changed to 8'b00001111, and MAX_NO to 7. The CCLs on all units will interrupt their CPU to alert them to re-read the CCL registers and update their forwarding tables. The state of the stack will quickly be healed into the original topology.

Software and Hardware Interaction

Figure 26A:
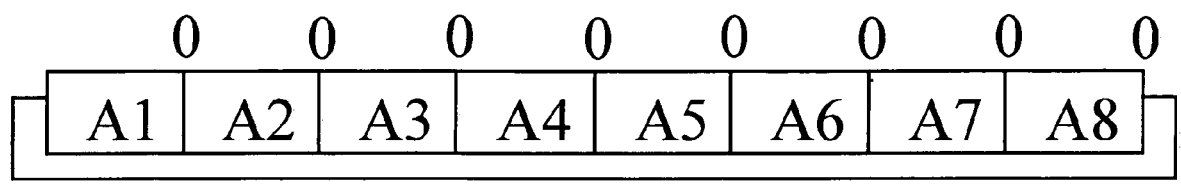
FIGS. 26A to 26E illustrate a numbering scenario.
Figure 26B:
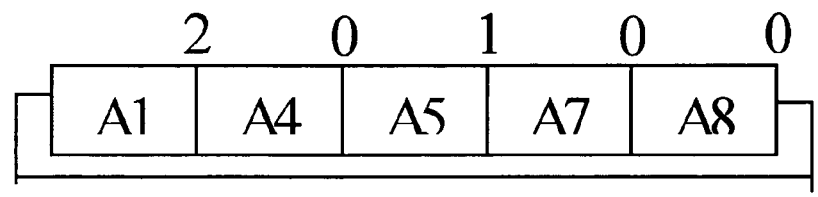
Figure 26C:
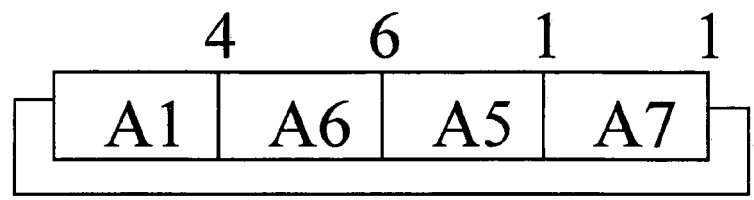
Figure 26D:
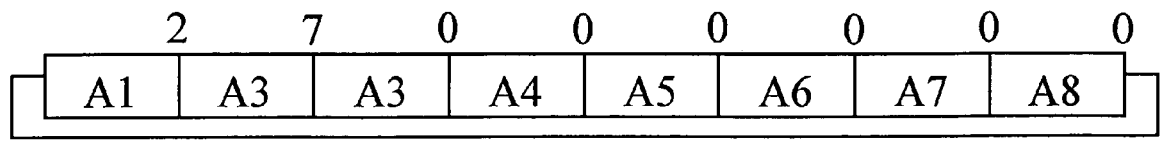
Figure 26E:
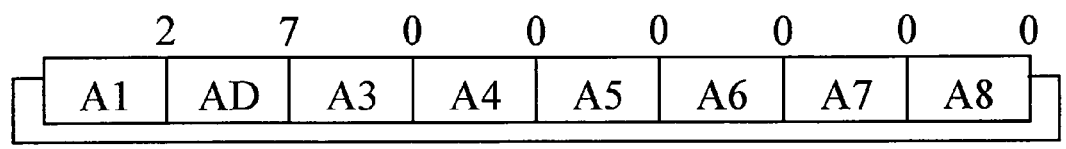

FIG. 26A onwards describe various numbering scenarios. Broadly however, they are based on the following process:

The software inserts any previous unit number into the hardware. The hardware attempts to determine suitable unit number assignments based on those set by the software. If the hardware determines a successful configuration, the software will confirm it. If the hardware fails to determine a successful unit number configuration, the software will attempt to find one, as described later. This may include sending packets between switches. Once the fabric is stable and the software has confirmed the fabric topology then it will save the unit numbers in flash memory for future use.

Note that the hardware may flag unit number errors when they are actually valid. For example, manual-assigned fabrics may contain out of sequence unit numbers.

A condition that will result in a failed configuration is if the user has more than eight units connected in the fabric. This will result in units being isolated. The software will display a visible error condition to alert the user.

The first time a fabric is commissioned this negotiation process may take longer (particularly if there is a resilient cable installed), but for subsequent power cycles of switches or whole fabrics the number allocation will be a formality since at start up the software can provide the correct unit numbers for the switches prior to the start of the main software.

Hardware Interruptions

Once a fabric has been established, the hardware will monitor the system and alert the software of any system state changes via an interrupt. When an interrupt is fired the software will examine the CCL registers to determine any state change. The software may use indications of which units are powered on (e.g. a bitmap—one bit per unit); the units currently present in the fabric (e.g. another bitmap—one bit per unit); a unit numbering clash; and whether there are too many units.

The software will use these events to reconfigure the fabric as necessary. The software will always make a best-effort attempt to reconfigure the fabric without rebooting, however if an irrecoverable conflict is discovered, the software may reset the fabric to allow the conflict to be resolved.

Hardware State Transitions

The CCL hardware can detect loss/addition of cable with the link level protocol. It can check if the required number scheme rules are met (passes up the fabric unit Number and checks downstream unit number against own unit number). Provided the software can identify the primary hardware unit (used to be either no down connection or different cable type for resilient cable) it can auto number both a simple daisy connection and a resilient fabric. It can provide information to the software about the nature of the fabric problem—cable failure, unit number clash, unknown primary hardware unit (i.e. a resilient ring), out of sequence numbers, switch in fabric is powered down but still connected.

From the software perspective the CCL hardware has two states; the fabric is stable or has a failure. From the software perspective the hardware has one event: the hardware interrupts the CPU and provides a register to indicate the current state of the fabric The hardware can interrupt the CPU when it detects a change in the fabric state and can provide registers to the CPU to allow it to determine what the current state of the fabric is. In the simplest case the hardware could return to stable state because of operator intervention before the software has completed the required processing (the software will not perform all the necessary tasks within the flow of a single interrupt service routine). In other cases the fabric may remain in a failure state until the software takes corrective action.

Unit Powered On

This field is a bitmap that defines the current of each unit's power supply. Powering a unit on or off will cause this field to change.

Units Currently Present in the Fabric

This field is a bitmap that defines which unit numbers are currently present in the fabric. Making or breaking a fabric connection will cause this field to change.

Unit Numbering Clash

This field is a single bit that gets set when any unit determines that its unit number has already been assigned to another unit in the fabric.

If a numbering clash occurs in a working fabric, the software must be capable of recovering without forcing the fabric to reboot.

Too Many Units

This field is a single bit that gets set when any unit determines that the maximum number of units has been exceeded.

Unit Numbering Modes

Units within a fabric may have unit numbers assigned in one of two modes, auto or manual.

Auto-assigned unit numbers can be seen as 'best effort' unit numbers. If a unit numbering conflict arises, the software is permitted to change auto-assigned unit numbers to resolve the conflict. Auto-assigned unit numbers will be a result of the software applying unit numbers to factory default units, however, there is one case where auto-assigned unit numbers may also be applied by the user. One scenario requiring a user to auto-assign a unit number would be when a failed unit needs to be replaced and the user wants to perform a remote, configuration restore before inserting the new unit back into the fabric.

In a non-resilient wired fabric, the unit without a down port connection, i.e. the physically lowest unit, will be assigned unit number 1. When automatically configured by the software, the lowest unit will always be assigned unit number 1.

In a resilient wired fabric, the system cannot detect a physically lowest unit, so the unit with the lowest MAC address will be assigned unit number 1. The factory default setting will be auto-default.

When unit numbers are applied in this mode, the ascending unit numbers rule must be obeyed.

When a user wires up an auto-assigned resilient fabric, the unit with the lowest MAC address will be assigned unit number 1. It is likely that this unit will be physically located in the middle of the fabric. To allow the user to determine where in the unit number 1 should be, he may assign a single unit to be User-assigned-1. A User-Assigned-1 configuration may only be applied to a single unit in an auto-assigned resilient fabric. If a resilient fabric contains more than one unit with a User-Assigned-1 configuration, the software will select the one that has the lowest MAC address and will set the configuration/s of the other unsuccessful unit/s to the factory default 'auto-default' state. If a user configures any unit in the fabric to be User-Assigned-1, any other units that currently have this configuration will revert to the factory default 'auto-default' state.

Manual-assignments may only be applied by the user. If a unit numbering conflict arises, the software may not change manual-assigned unit numbers to resolve the conflict. The only option the software has to resolve the conflict is to isolate one or more units in the fabric.

When unit numbers are applied in this mode, the ascending unit numbers rule does not need to be adhered to. The user is allowed to use any numbering scheme. Even totally random unit numbers are permitted.

Fabrics may not contain mixed auto and manual assigned modes. All units in a fabric must use the same unit number assignment mode. If a fabric is formed that consists of units with mixed assignment modes, the selected mode will be determined based on:

Past history: Where the software can determine that the previous configuration used a particular mode and new units have been added, the previous mode will be retained. In the case of a fabric merge, where each part of the fabric has a previous history the next rule will be applied.

By majority: The selected mode will be the one used by the majority of the units. If there are equal numbers of units using each mode, then the fabric will revert to manual-assigned mode.

Once the mode has been determined, all units that are not in the correct mode will be isolated.

Assignment Mode Restrictions

The following rules apply to both automatic and manual configured units:

No unit may be assigned a unit number greater than the number of units able to exist in a fabric. This maximum is currently eight.

Every unit number in a fabric must be unique. No duplicates are allowed.

Automatic-assignments

Unit numbers will be automatically assigned by the software when:

One or more factory default units are added to an existing fabric.

There is a topology change in an existing fabric and one or more units now have invalid unit numbers.

When the applying unit numbers to a complete fabric, the software will always apply sequential unit numbers.

When applying a unit number to a factory default unit, it will assigned a unit number one greater than the unit connected to its down port—unless the prior unit is unit number 8, which will result in the new unit being assigned unit number 1.

Manual-assignments

Where two or more units have been manually assigned the same unit number, only one unit may join the fabric. The other unit/s must be isolated. To determine which should join, apply the following rules:

(i) Check any previous configuration. If the software can determine which of the duplicate units has just been added, it can then make judged decision on which unit/s to isolate.

(ii) If none of the duplicated unit/s existed in the previous configuration, the unit with the lowest MAC address must join the fabric. The other unit/s must be isolated.

Saving Unit Number Configuration

To enable units to preserve their unit numbers during reboots/resets, it is necessary to store this information in local permanent storage. The assignment mode, either manual or automatic, must also be stored.

To allow this information to be accessed early on during the boot cycle, probably before the usual memory retrieval system has been initialised, this information should preferably stored in a specific location in flash memory.

Rebooting/Resetting a Fabric

When a fabric is power cycled/reset the following will occur:

The software will attempt to recover any previous unit number configuration. If a previous configuration can be determined and the fabric topology has not changed, then any previous unit numbers should be applied.

If there is no previous configuration, or the topology has changed the software will then determine the unit number assignment mode, either automatic or manual, of the fabric. If all units are in the same mode, then this mode will be selected. If there are mixed modes, the selected mode will be the one used by the majority of the units. If there are equal numbers of units using each mode, then the fabric will revert to manual-assigned mode. Once the mode has been determined, all units that are not in the correct mode will be isolated.

If in auto-assigned mode, assign unit numbers to any factory default units and then check that the current configuration is valid as per the rules described in the previous section. If the configuration is invalid, apply a new one.

If in manual-assigned mode, check that the current configuration is valid as per the rules described in the previous section. If the configuration is invalid, isolate offending units as described in the previous section.

Removing Units from a Fabric

Removing a unit from a fabric should not interrupt the operation of the remaining units.

Adding New Units to an Existing Fabric (i) Auto-assigned Fabrics

Adding correctly configured unit/s to an existing fabric should not interrupt the operation of the fabric. If a user adds factory default units to the top/bottom of an existing fabric, the software will assign these new units valid unit numbers without interrupting the operation of the fabric. However, if a user adds factory default units in between existing sequentially numbered units, for example between 3 & 4, the software will need to renumber one or more of the pre-existing units, which will interrupt the operation of the fabric.

(ii) Manual-assigned Fabrics

If a user adds a factory default unit to a manual-assigned fabric, these units will be isolated until they are given manual-assigned unit numbers.

If a user adds a pre-configured unit to an existing fabric, providing its unit number is unique it will successfully join the fabric. If the unit number already exists in the fabric it will be isolated.

System Monitoring

The system is preferably able to notice the following conditions and act accordingly:

Unit Powered On/Off: If a unit is powered off, the other units will need to update their address databases so that no packets are forwarded to the powered down unit. When the unit is powered up, the other units need to be made aware of this new state.

Unit joining/leaving the fabric: If a unit joins the fabric, the master unit must automatically determine its configuration mode and if applicable, its unit number to decide whether it should be permitted to join the fabric. If the new unit requires existing unit numbers to be updated, this should be performed automatically.

Too many units in the fabric: If there are more than eight units in the fabric, the system will need to isolate one or more units.

Unit Numbering

The unit with the lowest MAC address will become the master unit and will assume the role of assigning unit numbers to all units in the fabric. It is expected that this process will take a reasonable amount of time and will delay the boot time for the fabric as a whole. It will also be dependant on the size and configuration of each of the units in a fabric since a 48-port unit will take longer to boot than a 24-port unit. To accelerate the boot time the cascade control software will save the final confirmed unit number allocation in Flash and restore this as the "Soft" unit number allocations on subsequent re-starts to accelerate the unit number allocation times.

Fabric of Factory Default Units

In a fabric consisting of factory default units, the unit numbering rules are as follows: If there is not a resilient connection, the lowest unit (the one with no down link) will be assigned unit number 'one'. The other units will be assigned incrementing unit numbers up to the maximum number eight. If there is a resilient connection, the unit with the lowest MAC address will be assigned unit number 'one'. The other units will be assigned incrementing unit numbers up to the maximum of number eight. Once a working set of unit numbers has been determined, this information will be stored in flash memory for future use.

Fabric with No Configuration Changes

When a fabric is power cycled/reset and the existing configuration has not changed, the previous unit numbers, retrieved from memory, will be assigned to all units.

Manual-assigned Fabric with Configuration Changes

If a particular combination of manual-assignments causes a conflict, the software must make a best effort attempt to resolve the conflict, but it must not change any existing assignments. It may isolate one or more manual-assigned units from the fabric to resolve the conflict.

Where duplicate manual-assigned unit numbers exist in a fabric, the software must use knowledge of the previous configuration to try and determine which units should be isolated. The following rules should be applied:

If one of the duplicated units previously existed in the fabric, then retain this unit and isolate the other 'new' duplicated units.

If none of the duplicated units previously existed in the fabric, then select the unit with the lowest MAC address to join the fabric. The other unit/s must be isolated from the fabric.

Auto-assigned Fabric with Configuration Changes

When a configuration has changed, the new set of unit numbers needs to be examined to determine whether or not it is valid. Where the configuration is invalid a new set of unit numbers needs to be assigned. Where possible, the software will try to retain existing unit numbers, but if new units have been added in between existing sequential unit numbers, some of the existing unit numbers will need to be changed. Once a working set of unit numbers has been determined, this information will be stored in flash memory for future use.

Unit Number Assignment Rules

When applying a new set of unit numbers to a fabric, use the following rules to determine any new unit numbers:

Rule 1: Assign unit numbers to any factory default units.

Always assign the following unit number: (Down_Port_Unit_Number+1)

Unless this unit is number 8, in which case assign this unit the unit number 1!

Rule 2: Determine whether the current configuration is valid

Use the following method to determine whether the existing configuration is valid. If it is not then apply Rule 3 below:

Calculate all gap sizes between units in terms of the number of missing intervening units. For example, the gap size between units 2 & 5 would be 2 because two units (3 and 4) are missing and the gap size between units 7 & 3 would be 3 (8, 1 & 2). Duplicate adjacent units will have a gap of 7. For example between two units both numbered 3, the gap would consist of 4, 5, 6, 7, 8, 1, & 2. Add up the total number of gaps. If ((total gap sizes+No of units)<=8) then the configuration is valid.

FIGS. 26A to 26E illustrate various examples.

In the example of FIG. 26A, there are unit numbers applied incrementally to eight units, beginning at '1'. The aggregate of the 'gaps' is (0+0+0+0+0+0+0+8)<=8 and the configuration is valid. For the example of FIG. 26B, the aggregate is (2+0+1+0+0+5)<=8, and the configuration is valid. For the example in FIG. 26C, the aggregate of the 'gaps' is (4+6+1+1)>8 and the configuration is invalid. For the example in FIG. 26D, the aggregate of the 'gaps' is (2+7+0+0+0+0+0+0+8)>8 and the configuration is invalid. For the example in FIG. 26E, the aggregate of the 'gaps' is (2+7+0+0+0+0+0+0+8)>8 and the configuration is invalid.

Rule 3:

When over-riding a set of numbers:

(a) If a single unit has been allotted unit number 'User-Assigned-1', retain this number.

(b) If more than one unit has been allotted unit number 'User-Assigned-1', retain the number for the unit with the lower or lowest MAC address, marking the other unit or units as 'auto-default'.

(c) If no single unit has been allotted unit number 'User-Assigned-1', retain the lowest non-duplicated number and renumber from there.

EXAMPLES

Figure 27A:
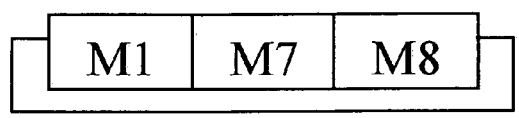
FIGS. 27A to 27C illustrate another numbering scenario.
Figure 27B:
Figure 27C:
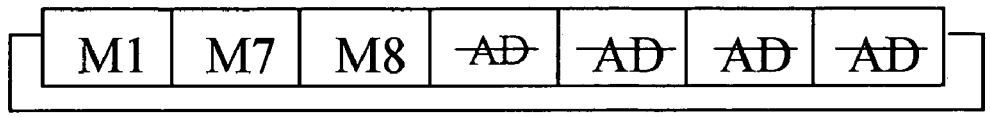

FIG. 27A illustrates a resilient stack with three units in manual assigned mode, numbered 1, 7 and 8 being denoted M1 etc to indicate the mode as well as the number. Now four 'factory-default' units AD (all in 'automatic-assigned' mode) are added into the resilient stack. The new stack is shown in FIG. 27B. It has mixed manual and automatic assignment modes. This is determined by the software from the stored indications of the mode. The fabric will remain in the manual-assigned mode and the four new units are isolated from the rest of the stack, as shown by the strike-through indications in FIG. 27C.

Figure 28A:
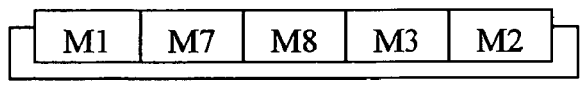
FIGS. 28A to 28D illustrate another numbering scenario.
Figure 28B:
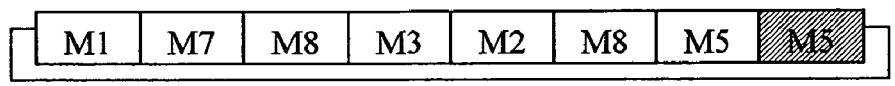
Figure 28C:
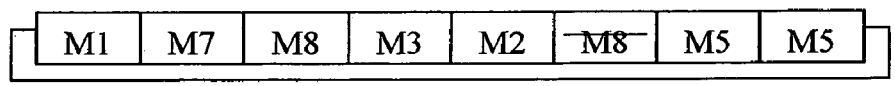
Figure 28D:
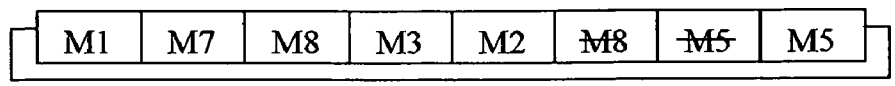

FIG. 28A illustrates a stack with five units in manual-assigned mode and numbered 1, 7, 8, 3 and 2. FIG. 28B shows the addition of three units in manual-assigned mode and numbered M8, M5 and M5 (a duplication of numbering). The unit with the lowest MAC address (the furthest right) is shaded. Owing to the 'manual-assigned' mode of the two duplicated numbers the software cannot resolve the conflict and two units will have to be isolated. Since the first unit M8 was previously present the new M8 is isolated as shown in FIG. 28C. For the duplication of M5, the unit with the lower MAC address is retained and the new one is isolated as shown in FIG. 28D.

FIG. 29A illustrates a non-resilient fabric composed of eight factory default (auto-assignment mode) units. FIG. 29A shows the units in their initial state, the fifth unit from the left having the lowest MAC address. Since the left-most unit has no 'down-port' connection it is assigned unit number 1, and the other units are assigned incrementing unit numbers beginning with this number. FIG. 29B illustrates the assignment of numbers beginning at the left-hand end. FIG. 29C shows the gap values. Since the aggregate of the gaps does not exceed 8 the numbering is valid.

Figure 30A:
FIGS. 30A to 30E illustrate another numbering scenario.
Figure 30B:
Figure 30C:
Figure 30D:
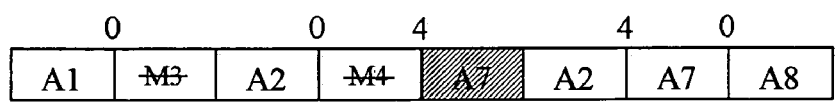
Figure 30E:

FIG. 30A illustrates a non-resilient fabric made from eight 'randomly' selected units of which three (A1, A2 and two numbered A7) have previous auto-configuration, two (M3 and M4) are in manual-assigned mode and two are in auto mode but are un-numbered (AD). FIG. 30A shows the initial state with the shaded unit (the fifth unit from the left) having the lowest MAC address. Since the fabric contains mixed manual and auto-assigned unit numbers, the software must determine in which mode the fabric should operate. Since there are two in manual-assigned mode and six in auto-assigned modes, the fabric will be operated in the automatic mode which requires the manually configured units to be isolated (FIG. 30B). All the factory default units are given a unit number, so that the third unit from the left goes to A2 and the right-hand unit goes to A8. This is shown in FIG. 30C. Since however, the current configuration is not valid, the sum of the gaps (as shown in FIG. 30D) being 14, a new configuration is required. From rule 3 the physically lowest unit, that is to say the one without a down port connection, is assigned unit number 1, as shown in FIG. 30E. The new software applied numbers will take the two isolated units (M3 and M4) into account so that when the user changes their configuration from manual to automatic they will be able to join the fabric without any number change in the other units.

Figure 31B:
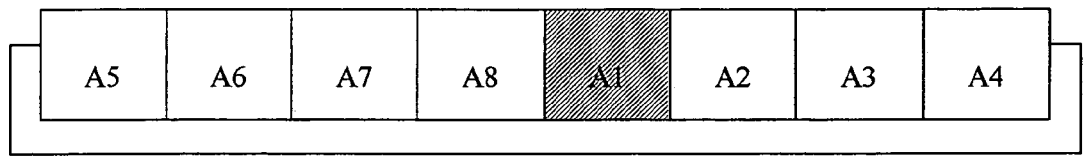
FIGS. 31A to 31C illustrate another numbering scenario.
Figure 31A:
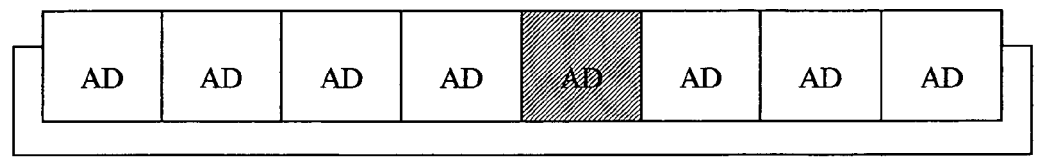
Figure 31C:
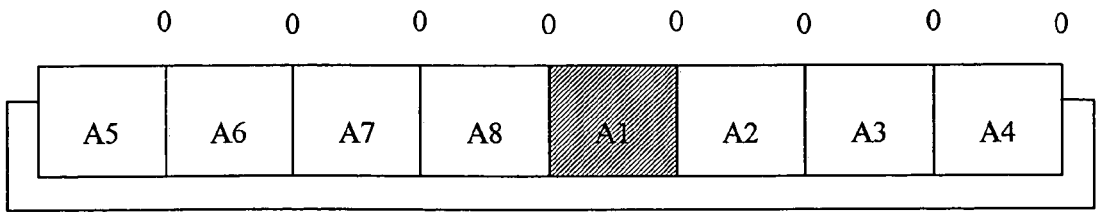

FIG. 31A illustrates a new resilient fabric formed from eight factory default units all in automatic-assigned mode. The fifth unit from the left is the one with the lowest MAC address. This is assigned unit 1 and the other units are assigned incrementing unit numbers, as shown in FIG. 31B. The allocation of numbers is valid: the gaps are shown in FIG. 31C.

Figure 32A:
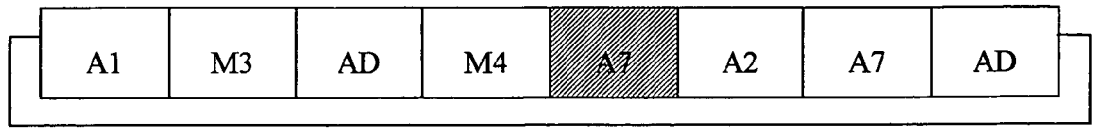
FIGS. 32A to 32E illustrate another numbering scenario.
Figure 32B:
Figure 32C:
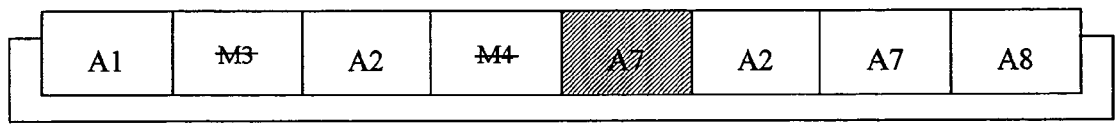
Figure 32D:
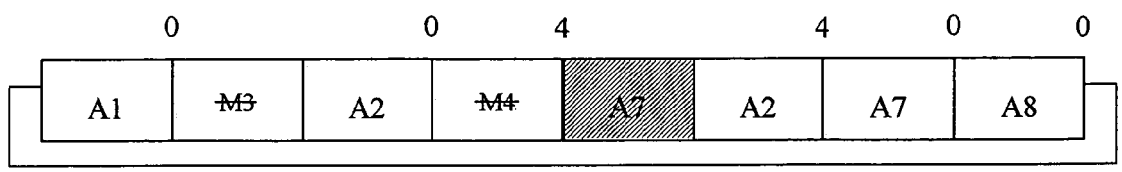
Figure 32E:
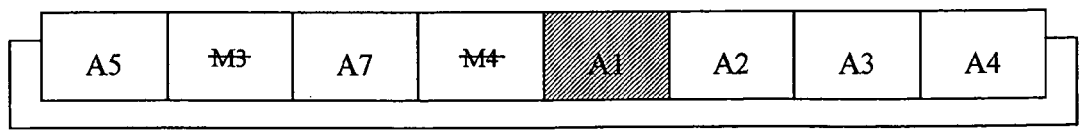

FIG. 32A illustrates a new resilient fabric formed from eight randomly selected units. Since there are two manual-assigned units and six automatic-assigned units, the fabric is operated in the automatic mode so that the two manually-assigned units (M3 and M4) are isolated, FIG. 32B. Applying rule 1, the factory default units are given a unit number as shown in FIG. 32C. The gaps between units are shown in FIG. 32D. The aggregate of the gaps is 14 so the numbering is invalid. Applying rule 3, and ignoring 'user-assigned 1', the unit (shaded) with the lowest MAC address is assigned unit number 1. As shown in FIG. 32E, the software numbering takes the two isolated units into account so that when the user changes a configuration from manual to automatic they will be able to join the fabric without any of the other units requiring number changes.

Figure 33A:
FIGS. 33A to 33D illustrate another numbering scenario.
Figure 33B:
Figure 33C:
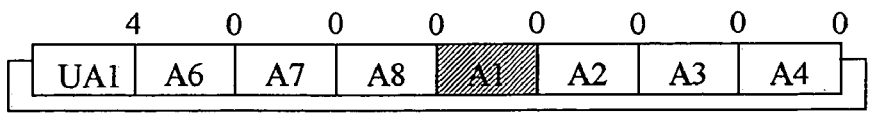

FIG. 33A illustrates an eight-unit resilient fabric in which unit number 1 is in the middle of the fabric (because it has the lowest MAC address). However, the user desires the physically lowest unit, currently assigned A4, to be unit number 1. The new state is shown in FIG. 33B. Since there has been a configuration change, it would be necessary to assign unit numbers to any default units. Since there are none, rule 2 is applied to determine the gap aggregate. FIG. 33C shows that there is a gap of four between the left-most and the unit next to it so the configuration is invalid. User-assigned 1 is used as the starting point and the new (valid) numbering is shown in FIG. 33D.

Figure 33D:
Figure 34A:
FIGS. 34A to 34E illustrate another numbering scenario.
Figure 34B:
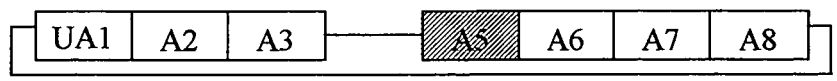
Figure 34C:
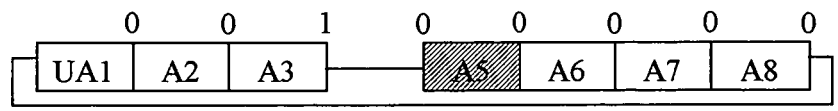

FIG. 34A illustrates the stack shown in FIG. 33D with unit 4 failed. Once again unit A5 has the lowest MAC address. As a first step the unit will remove unit A4 from the fabric but will connect unit numbers 3 and 5 (FIG. 34B). There has been a configuration change. Rule 1 above is not applicable because there are no factory default units. FIG. 34C illustrates the gap size between the units.

Figure 34D:
Figure 34E:
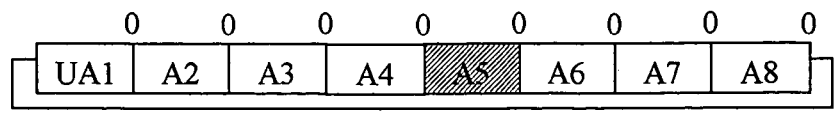

FIG. 34D shows the addition of a factory default unit, i.e. in an auto-assigned mode between units 3 and 4. There is one factory default unit so it is given the number 4 (incrementing the down port unit number). The gap sizes between the units aggregate to eight so that the configuration shown in FIG. 34E is valid.

Figure 35A:
FIGS. 35A to 35C illustrate another numbering scenario.
Figure 35B:
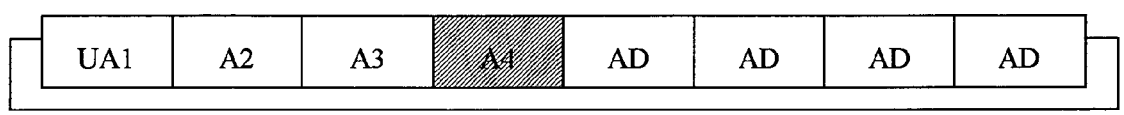
Figure 35C:
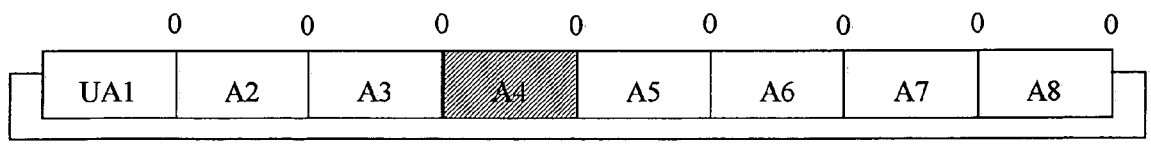

FIG. 35A illustrates an existing four-unit fabric to which four units are to be added. FIG. 35B shows the addition of the four default units. Applying rule 1, the new numbers are 5, 6, 7 and 8, which yields a valid configuration. The gaps aggregate to 8 as shown in FIG. 35C.

The invention claimed is:

1. A network unit for the reception and forwarding of data packets and for use in a stack of similar units, the network unit including a data processor and cascade control logic for the exchange of control frames with others of said units in the stack, wherein
    (a) the cascade control logic is operative to cooperate by means of said control frames in an automatic process for incrementally applying stack numbers to the units in the stack;
    (b) the cascade control logic is also operative to retain a stack number in storage; and
    (c) the data processor is operative to execute, in response to a stack configuration change, a program to apply to the network unit and other units progressive stack numbers which accommodate the previously applied and retained stack numbers where those stack numbers are valid in the changed configuration, and changes any previously applied and retained stack numbers that are not valid in the changed configuration.

2. A network unit as in claim 1 wherein the network unit can act as a master applying said program to said other units and as a slave whereupon it receives a stack number determined by another unit in the stack.

3. A network unit as in claim 1 wherein said program determines the validity of a set of numbers applied to units in the stack by computing the aggregate of numbering gaps between numbered units and comparing the aggregate with a predetermined maximum.

4. A network unit as in claim 1 wherein the program distinguishes between units which are in an automatic numbering mode and a non-automatic numbering mode and disregards units in the non-automatic numbering mode in the application of progressive stack numbers.

5. A network unit as in claim 1 wherein the stack configuration change is a change in the number of active units in said stack.

6. A network unit for the reception and forwarding of data packets and for use in a stack of similar units, the network unit including a data processor and cascade control logic for the exchange of control frames with others of said units in the stack, wherein (a) the data processor is operative to execute a program to apply to the network unit and other units a set of progressive stack numbers;

(b) the data processor is operative, in accordance with said program, on a change in the configuration of the stack to re-execute said program to apply a stack number to any new unit in the stack while accommodating any pre-existing stack number of a unit in the stack having a valid pre-existing stack number in the changed configuration and changing any pre-existing stack number of a unit that is invalid in the changed configuration; and (c) the data processor is operative, in accordance with said program, to determine the validity of the numbering of the stack according to whether the aggregate of numbering gaps in the stack numbers applied to the units exceeds a predetermined number.

7. A network unit as in claim 6 wherein the network unit can act in two different modes, viz. a master mode wherein it applies said program to said other units and in a slave mode whereupon it receives an identification number determined by another unit in the stack.

8. A network unit as in claim 6 wherein said program determines the validity of a set of identification numbers applied to units in the stack by computing the aggregate of numbering gaps between numbered units and comparing the aggregate with a predetermined maximum.

9. A network unit as in claim 6 wherein the program distinguishes between units which are in an automatic numbering mode and a non-automatic numbering mode and disregards units in the non-automatic numbering mode in the application of said progressive identification numbers.

\* \* \* \* \*

UNITED STATES PATENT AND TRADEMARK OFFICE
CERTIFICATE OF CORRECTION

PATENT NO. : 7,660,323 B2  Page 1 of 1
APPLICATION NO. : 10/876654
DATED : February 9, 2010
INVENTOR(S) : Saunderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 962 days.

Signed and Sealed this

Thirtieth Day of November, 2010

David J. Kappos
*Director of the United States Patent and Trademark Office*